(12) United States Patent
Kent et al.

(10) Patent No.: US 6,612,368 B2
(45) Date of Patent: Sep. 2, 2003

(54) FLOW COMPLETION APPARATUS

(75) Inventors: Richard D. Kent, Newburgh (GB); Michael R. Tierney, Bridge of Allen (GB); Gregory L. Glidden, Spring, TX (US); Chistopher E. Cunningham, Spring, TX (US); Christopher D. Bartlett, Spring, TX (US)

(73) Assignee: FMC Technologies, Inc., Chicago, IL (US)

( * ) Notice: Subject to any disclaimer, the term of this patent is extended or adjusted under 35 U.S.C. 154(b) by 23 days.

(21) Appl. No.: 09/815,430

(22) Filed: Mar. 22, 2001

(65) Prior Publication Data

US 2002/0000315 A1 Jan. 3, 2002

Related U.S. Application Data

(60) Provisional application No. 60/192,124, filed on Mar. 24, 2000, and provisional application No. 60/268,329, filed on Feb. 12, 2001.

(51) Int. Cl.[7] .................. E21B 33/03; E21B 33/068
(52) U.S. Cl. ................ 166/75.13; 166/86.3; 166/91.1; 166/97.1
(58) Field of Search .............................. 166/368, 85.4, 166/86.3, 87.1, 91.1, 92.1, 93.1, 94.1, 97.1, 75.13, 85.1, 85.5

(56) References Cited

U.S. PATENT DOCUMENTS

| | | | |
|---|---|---|---|
| 3,207,221 A | * | 9/1965 | Cochran et al. ............. 166/85.4 |
| 3,409,084 A | * | 11/1968 | Lawson, Jr. et al. ........ 166/86.1 |
| 4,405,016 A | * | 9/1983 | Best ............................. 166/337 |
| 4,461,354 A | * | 7/1984 | Buras et al. ................. 166/343 |
| 4,651,831 A | | 3/1987 | Baugh |
| 4,848,457 A | | 7/1989 | Lilley |
| 4,958,686 A | | 9/1990 | Putch |
| 5,143,158 A | | 9/1992 | Watkins et al. |
| 5,503,230 A | | 4/1996 | Osborne et al. |
| 5,544,707 A | | 8/1996 | Hopper et al. |
| 5,884,706 A | * | 3/1999 | Edwards ..................... 166/335 |
| 5,971,077 A | | 10/1999 | Lilley |
| 5,992,526 A | * | 11/1999 | Cunningham et al. ...... 166/343 |
| 5,992,527 A | | 11/1999 | Garnham et al. |

(List continued on next page.)

FOREIGN PATENT DOCUMENTS

| | | |
|---|---|---|
| EP | 0 845 577 A1 | 6/1998 |
| GB | 2 166 775 A | 5/1986 |
| GB | 2 319 544 A | 5/1998 |
| GB | 2 320 937 A | 7/1998 |
| GB | 2 321 658 A | 8/1998 |
| WO | WO 97/04211 A1 | 2/1997 |
| WO | WO 99/18329 A1 | 4/1999 |
| WO | WO 00/47864 A1 | 8/2000 |
| WO | WO 01/55550 A1 | 8/2001 |

*Primary Examiner*—David Bagnell
*Assistant Examiner*—Jennifer H Gay
(74) *Attorney, Agent, or Firm*—Henry C. Query, Jr.

(57) ABSTRACT

A flow completion apparatus comprises a wellhead housing installed at an upper end of a well bore and a tubing spool connected over the wellhead housing. The tubing spool includes a central bore extending axially therethrough, a production outlet communicating with the central bore and an annulus passageway communicating with the tubing annulus. A tubing hanger is supported in the central bore and includes a production bore extending axially therethrough and a production passageway communicating between the production bore and the production outlet. An annular seal is positioned between the tubing hanger and the central bore above the production passageway, and the tubing spool comprises a workover passageway extending between the annulus passageway and a portion of the central bore located above the seal. Furthermore, the tubing hanger comprises an annulus bore extending between the workover passageway and the top of the tubing hanger.

19 Claims, 22 Drawing Sheets

U.S. PATENT DOCUMENTS

| | | | | |
|---|---|---|---|---|
| 5,996,697 A | * | 12/1999 | Vick et al. | 166/115 |
| 6,015,013 A | * | 1/2000 | Edwards et al. | 166/340 |
| 6,039,119 A | | 3/2000 | Hopper et al. | |
| 6,050,339 A | * | 4/2000 | Milberger | 166/348 |
| 6,053,252 A | * | 4/2000 | Edwards | 166/338 |
| 6,076,605 A | * | 6/2000 | Lilley et al. | 166/344 |
| 6,082,460 A | | 7/2000 | June | |
| 6,152,230 A | * | 11/2000 | Edwards et al. | 166/337 |
| 6,227,300 B1 | * | 5/2001 | Cunningham et al. | 166/339 |
| 6,227,301 B1 | * | 5/2001 | Edwards et al. | 166/344 |
| 6,302,212 B1 | * | 10/2001 | Nobileau | 166/368 |
| 6,367,551 B1 | * | 4/2002 | Fenton | 166/345 |
| 2001/0011593 A1 | * | 8/2001 | Wilkins | 166/368 |
| 2001/0042618 A1 | * | 11/2001 | Cunningham et al. | 166/86.3 |
| 2002/0000322 A1 | * | 1/2002 | Bartlett et al. | 166/368 |
| 2002/0011336 A1 | * | 1/2002 | Baskett et al. | 166/368 |

* cited by examiner

FLOW COMPLETION APPARATUS

This application is based on U.S. Provisional Patent Application No. 60/192,124, which was filed on Mar. 24, 2000, and U.S. Provisional Patent Application No. 60/268,329, which was filed on Feb. 12, 2001.

BACKGROUND OF THE INVENTION

The present invention relates to a flow completion apparatus for producing oil or gas from a subsea well. More particularly, the invention relates to a flow completion apparatus which comprises a tubing hanger having an annulus bore which is adapted to communicate with an annulus port in a tubing hanger running tool to provide for fluid communication between the tubing annulus and the choke and kill line of a blowout preventer which is installed over the tubing hanger during installation and workover of the flow completion apparatus.

Flow completion assemblies for producing oil or gas from subsea wells are generally categorized as either conventional or horizontal. A typical horizontal flow completion assembly, such as that disclosed in U.S. Pat. No. 6,039,119, comprises a wellhead housing which is installed at the upper end of the well bore, a tubing spool which is connected to the top of the wellhead housing and which includes a central bore extending axially therethrough, an annular tubing hanger which is suspended in the central bore, and a tree cap which is installed in the central bore above the tubing hanger. The tubing hanger supports at least one tubing string that extends into the well bore and defines a tubing annulus surrounding the tubing string. In addition, the tubing hanger comprises a concentric production bore which communicates with the tubing string and a lateral production passageway that extends between the production bore and a production outlet in the tubing spool. The tubing spool also includes an annulus passageway which extends from the tubing annulus to an annulus outlet, and a workover passageway which extends from the annulus passageway to a portion of the central bore that is located above the tubing hanger. These passageways provide for communication between the tubing annulus and the central bore above the tubing hanger during installation and workover of the flow completion assembly.

The regulations of certain countries pertaining to the subsea production of oil and gas require that the flow completion assembly provide at least two pressure-containing barriers between the well bore and the environment. In the typical horizontal flow completion assembly, the first barrier is provided by a wireline plug that is installed in the production bore above the production passageway, in conjunction with an annular, usually metal seal which is positioned between the tubing hanger and the tubing spool above the production outlet. The second barrier is provided by the tree cap, which is sealed to the tubing spool by an annular, typically metal seal and often includes an axial through bore which in turn is sealed by a wireline plug or other suitable closure member.

During installation of the flow completion assembly, the tubing spool is landed onto the wellhead housing, after which a blowout preventer ("BOP") is installed onto the tubing spool by means of a riser deployed from a surface vessel. The tubing hanger is then lowered on a tubing hanger running tool ("THRT") through the riser and the BOP and landed in the central bore of the tubing spool. The THRT is then retrieved and the tree cap is lowered on a dedicated tool, such as a THRT, through the riser and the BOP and landed in the central bore directly above the tubing hanger. After the tree cap is installed, the THRT is retrieved, the BOP is retrieved, and the flow completion assembly is ready to be put into production. During a typical workover of the flow completion assembly, the BOP and the riser are once again connected to the tubing spool, the tree cap is usually removed from the tubing spool, and the THRT is connected to the tubing hanger. Once the workover operations are completed, the THRT is retrieved and the tree cap is re-installed through the riser and the BOP. Then the THRT is retrieved, the BOP is retrieved, and the flow completion assembly is ready to be put back into production.

Since the tree cap is required to maintain well pressure in the event of a failure of the first barrier, the tree cap typically comprises a rigid metal body and a robust metal lockdown mechanism to firmly lock the body to the tubing spool. Consequently, the tree cap is usually too heavy to be installed by a remotely operated vehicle ("ROV") and must instead be lowered from the surface vessel on a specially designed tree cap running tool. Thus, installation of the tree cap requires a special running trip, both during installation of the flow completion assembly and after a workover operation. Each such trip typically requires a significant amount of valuable rig time to complete, which necessarily increases the cost of completing and maintaining the well.

In addition, during retrieval of the THRT prior to installing the tree cap, debris within the riser often falls into the central bore of the tubing spool above the tubing hanger. Left unattended, this debris could foul the sealing surfaces of the central bore and thereby prevent the tree cap from forming an effective seal with the tubing spool. Therefore, before the tree cap is installed the central bore must be thoroughly cleaned, a process that consumes additional valuable rig time and increases the cost of completing and maintaining the well.

Furthermore, during both installation and workover of the typical horizontal flow completion assembly, communication between the tubing annulus and the surface vessel is usually established through the annulus passageway, the workover passageway, and either the choke and kill lines of the BOP or the annulus between the THRT and the riser. For example, deep well circulation is often accomplished by pumping fluid down the THRT, through the production bore, through the tubing string, up the tubing annulus, through the annulus passageway, through the workover passageway, into the central bore above the tubing hanger and through the BOP choke and kill lines. One problem with this arrangement is that the flow in the central bore of the tubing spool above the tubing hanger is generally unrestricted, and this unrestricted flow can foul the tubing hanger lockdown mechanism and erode the central bore, including the locking profile and the annular sealing surface within the central bore against which the tree cap must lock and seal, respectively.

SUMMARY OF THE INVENTION

In accordance with the present invention, these and other disadvantages in the prior art are overcome by providing a flow completion apparatus for controlling the flow of fluid through a tubing string which extends into a well bore and defines a tubing annulus surrounding the tubing string. The flow completion apparatus comprises a wellhead housing which is installed at an upper end of the well bore; a tubing spool which is connected over the wellhead housing and which includes a central bore that extends axially therethrough, a production outlet which communicates with the central bore, and an annulus passageway which communicates with the tubing annulus; a tubing hanger which is supported in the central bore and is connected to an upper end of the tubing string, the tubing hanger including a production bore which extends axially therethrough and a production passageway which communicates between the production bore and the production outlet; a first closure member which is positioned in the production bore above the production passageway; and a first annular seal which is positioned between the tubing hanger and the central bore above the production passageway. Furthermore, the tubing spool also comprises a workover passageway which extends between the annulus passageway and a portion of the central bore that is located above the first seal, and the tubing hanger also comprises an annulus bore which extends between the workover passageway and the top of the tubing hanger. In this manner fluid communication between the tubing annulus and the top of the tubing hanger may be established through the annulus passageway, the workover passageway and the annulus bore.

In accordance with another aspect of the present invention, the flow completion apparatus further comprises a BOP which is removably connectable to the top of the tubing spool and which includes a BOP bore, a first set of BOP rams, and at least one choke and kill line that communicates with a portion of the BOP bore which is located below the first BOP rams; and a THRT which is removably connectable to the top of the tubing hanger and which includes a generally cylindrical outer diameter surface, a production port that communicates with the production bore, and an annulus port that communicates between the annulus bore and an opening which is formed in the outer diameter surface. Furthermore, the first BOP rams are adapted to sealingly engage the outer diameter surface above the opening. In this manner fluid communication between the tubing annulus and the BOP choke and kill line may be established through the annulus passageway, the workover passageway, the annulus bore, the annulus port and the portion of the BOP bore which is located below the first BOP rams.

In accordance with yet another aspect of the present invention, the BOP comprises a second set of BOP rams, the choke and kill line communicates with a portion of the BOP bore which is located between the first and second BOP rams, and the second BOP rams are adapted to sealingly engage the outer diameter surface below the opening. In this manner, fluid communication between the tubing annulus and the BOP choke and kill line may be established through the annulus passageway, the workover passageway, the annulus bore, the annulus port and the portion of the BOP bore which is located between the first and second BOP rams.

It may therefore be seen that the annulus bore in the tubing hanger provides a convenient means for connecting the tubing annulus with an annulus port in a THRT. In addition, the annulus port provides a closed path between the annulus bore and a BOP choke and kill line. Thus, the flow of fluid between the tubing annulus and the BOP choke and kill line will be restricted by the annulus bore and the THRT. Consequently, this flow will not erode or contaminate the central bore of the tubing spool.

In accordance with yet another aspect of the present invention, a first barrier between the well bore and the environment is provided by both the first closure member in the production bore and the first annular seal between the tubing hanger and the tubing spool. In addition, a second barrier between the well bore and the environment is provided by both a second closure member that is positioned in the production bore above the first closure member, and a second annular seal that is positioned between the tubing hanger and the tubing spool above the first seal. In this manner, both the first and the second barriers between the well bore and the environment are mounted in or on the tubing hanger. Consequently, the flow completion apparatus does not require a tree cap which is capable of sealing against the pressure in the well bore. Instead, a simple, lightweight debris cap can be installed on the tubing spool using an ROV, thereby saving the time and cost required to run a tree cap from a surface vessel during installation and workover operations.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

Figure 1:
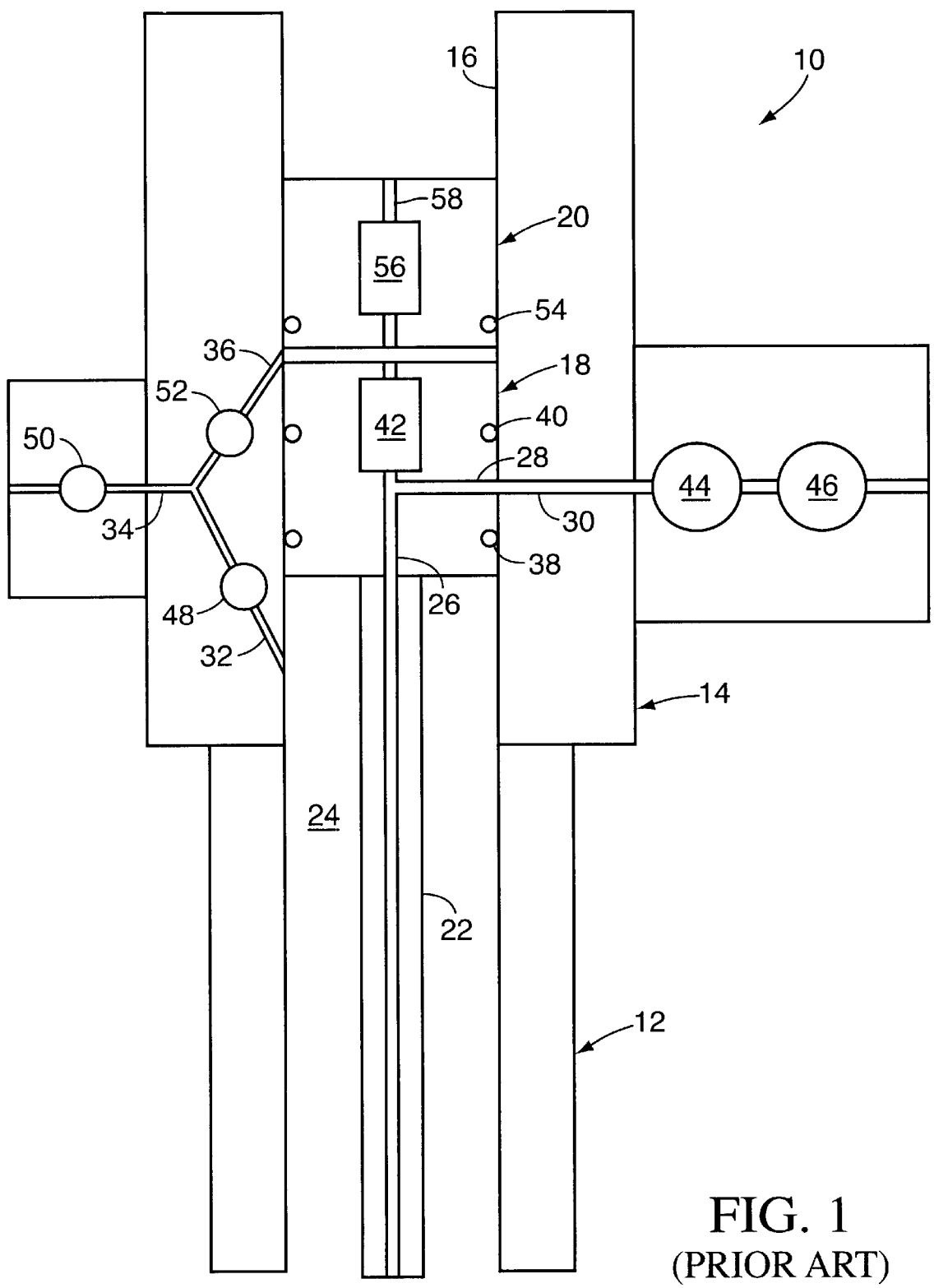
FIG. 1 is a representation of a prior art horizontal flow completion assembly shown in the production mode of operation.

Referring to FIG. 1, a prior art horizontal-type flow completion assembly 10 is shown to comprise a wellhead housing 12 which is installed at the upper end of a well bore (not shown), a tubing spool 14 which is connected and sealed to the top of the wellhead housing and which comprises a central bore 16 extending axially therethrough, a generally annular tubing hanger 18 which is suspended from a shoulder (not shown) located in the central bore, and a tree cap 20 which is installed in the central bore above the tubing hanger. The tubing hanger 18 is secured to the tubing spool 14 by a lockdown mechanism (not shown) and supports at least one tubing string 22 which extends into the well bore and defines a tubing annulus 24 surrounding the tubing sting. In addition, the tubing hanger 18 includes a production bore 26 which communicates with the tubing string 22 and a lateral production passageway 28 which extends between the production bore and the outer diameter of the tubing hanger. The tubing spool 14 includes a production outlet 30 which communicates with the production passageway 28, an annulus passageway 32 which communicates with the tubing annulus 24, an annulus outlet 34 which is connected to the annulus passageway, and a workover passageway 36 which extends between the annulus passageway and the portion of the central bore 16 above the tubing hanger 18. The tubing hanger 18 is sealed to the tubing spool 14 by a lower, typically metal seal ring 38 and an upper, also typically metal seal ring 40. In addition, the production bore 26 is sealed above the production passageway 28 by means of a wireline plug 42, which directs the flow of oil or gas from the tubing string 22 into the production outlet 30. A production master valve 44 and a production wing valve 46 are provided to control flow through the production outlet 30, while an annulus master valve 48, an annulus wing valve 50 and an workover valve 52 are provided to control flow through the annulus passageway 32, the annulus outlet 34 and the workover passageway 36, respectively.

During the production mode of operation of the flow completion assembly 10, which is depicted in FIG. 1, a first barrier between the well bore and the environment is provided by the upper seal ring 40 and the wireline plug 42. The second barrier is provided by the tree cap 20, more particularly, by a typically metal seal ring 54 which is disposed between the tree cap and the tubing spool 14 and a wireline plug 56 which is positioned in an axial bore 58 extending through the tree cap. Thus, in the prior art flow completion assembly 10, the first barrier is associated with the tubing hanger 18 while the second barrier is associated with the tree cap 20. Although not shown in FIG. 1, the tree cap 20 also includes a lockdown mechanism to secure the tree cap to the tubing spool 14.

Figure 2:
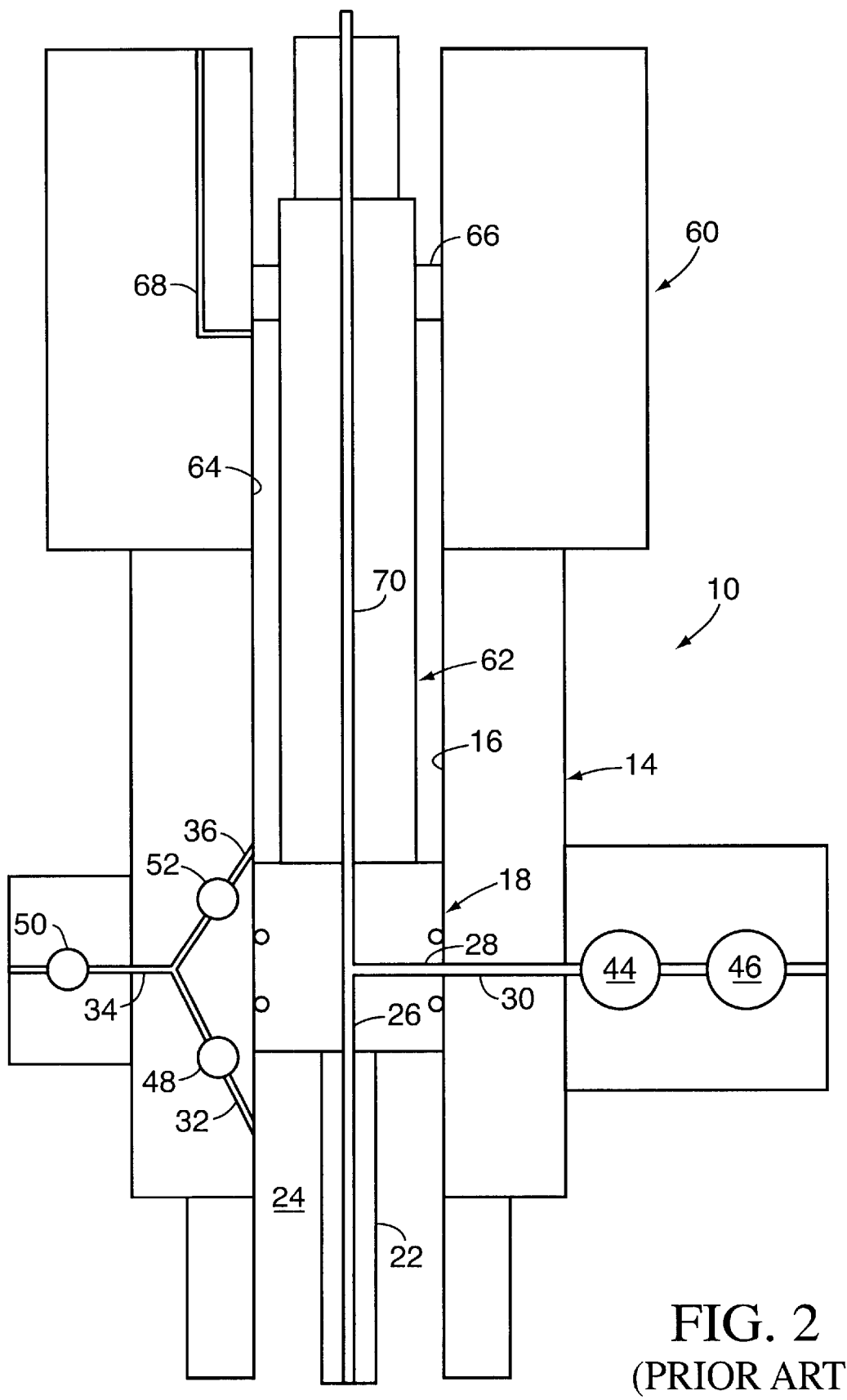
FIG. 2 is a representation of a prior art horizontal flow completion assembly shown in the installation or workover mode of operation.

Referring to FIG. 2, the flow completion assembly 10 is shown in the installation or workover mode of operation. In either of these modes of operation, a BOP 60 is connected to the top of the tubing spool 14 and a THRT 62 is attached to the top of the tubing hanger 18. The BOP includes an internal BOP bore 64, at least one set of rams 66 which is capable of sealing against the THRT 62, and at least one choke and kill line 68 for providing communication between the BOP bore below the rams 66 and a surface vessel (not shown). In addition, the THRT 62 comprises an internal bore 70, or production port, which connects to the production bore 26 via a production stab (not shown). Also, although the BOP rams are described herein as sealing against the THRT, it should be understood that the rams could instead seal against another member, such as an extension member, which comprises a production port that communicates with the production port of the THRT.

During both installation and workover of the flow completion assembly 10, communication between the tubing annulus 24 and the surface vessel may be established through the annulus passageway 32, the workover passageway 36, the central bore 16, the BOP bore 64, and the choke and kill line 68. For example, deep well circulation can be accomplished by pumping fluid down the THRT bore 70, through the production bore 26, through the tubing string 22, up the tubing annulus 24, through the annulus passageway 32, through the workover passageway 36, into the central bore 16 above the tubing hanger 18, into the BOP bore 64 and through the BOP choke and kill line 68. However, the flow through the central bore 16 above the tubing hanger 18 is relatively unrestricted, and this flow can foul the tubing hanger lockdown mechanism and erode the central bore, including the lockdown profile and the annular sealing surface within the central bore against which the tree cap 20 must lock and seal, respectively. If the tubing hanger lockdown mechanism becomes fouled, recovery of the tubing hanger from the tubing spool may be complicated. Additionally, if the tree cap cannot lock securely to the tubing spool 14 and form an effective seal against the central bore 16, then the flow completion assembly 10 will not provide the required second barrier between the well bore and the environment.

The present invention addresses the above-described limitations in prior art flow completion assemblies by providing for communication between the workover passageway and the BOP bore through the THRT and by mounting both the first and the second barriers solely on the tubing hanger.

Figure 3:
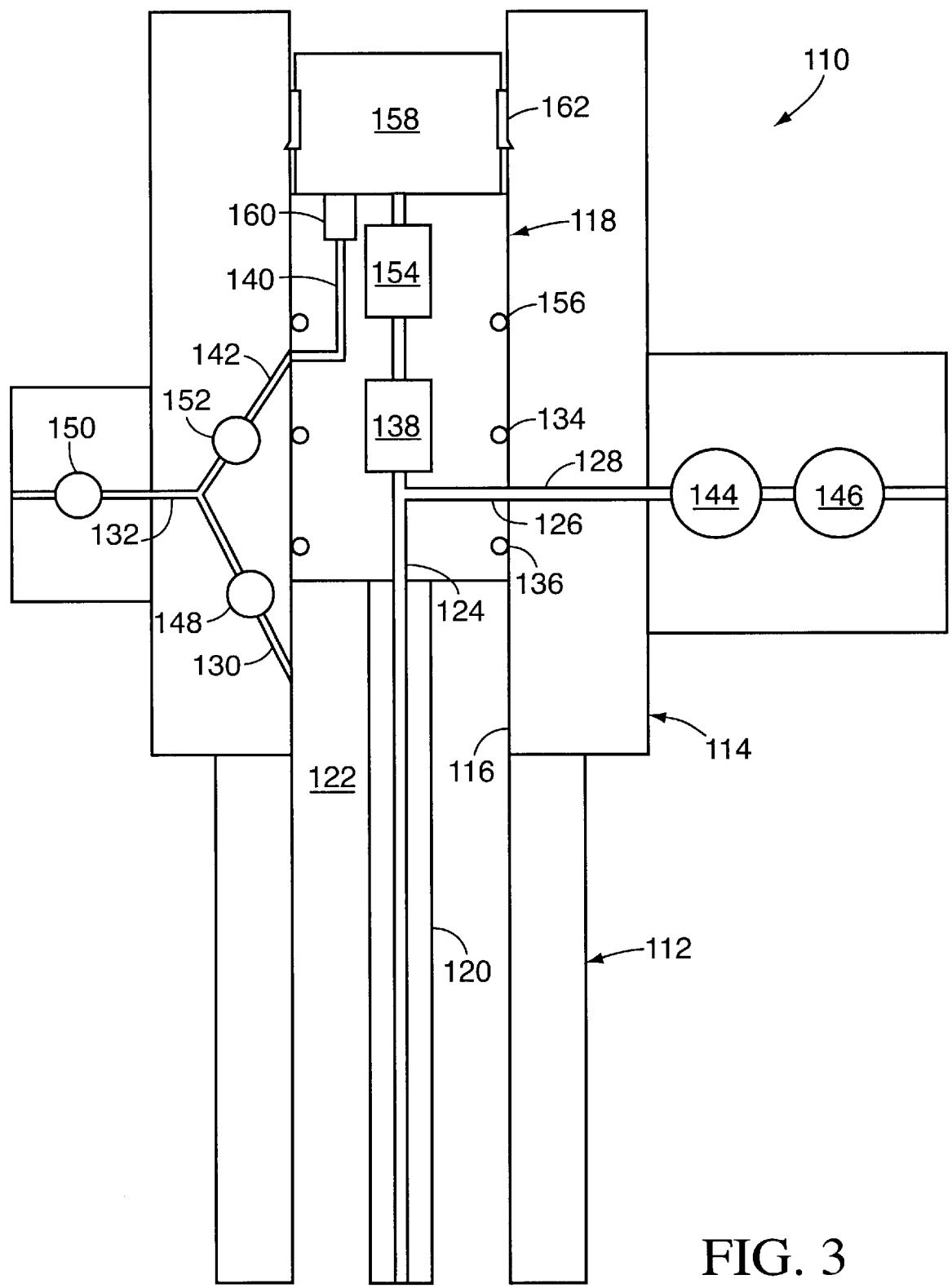
FIG. 3 is a representation of the flow completion apparatus of the present invention shown in the production mode of operation.

Referring to FIG. 3, one embodiment of a flow completion apparatus according to the present invention, which is indicated generally by reference number 110, is similar in many respects to the flow completion assembly 10 described above. Accordingly, the flow completion apparatus comprises a wellhead 112, a tubing spool 114 which is mounted on the wellhead and which includes a central bore 116 extending axially therethrough, and a generally annular tubing hanger 118 which is supported on a shoulder (not shown) located in the central bore and from which is suspended a tubing string 120 that extends into the well bore and defines a tubing annulus 122 surrounding the tubing string. As in the prior art flow completion assembly 10, the tubing hanger 118 is secured to the tubing spool 114 by a lockdown mechanism (not shown) and includes a production bore 124 which communicates with the interior of the tubing string 120 and a lateral production passageway 126 which extends between the production bore and the outer diameter of the tubing hanger. Similarly, the tubing spool 114 includes a production outlet 128 which communicates with the production passageway 126, an annulus passageway 130 which communicates with the tubing annulus 122, and an annulus outlet 132 which is connected to the annulus passageway. In addition, the tubing hanger 118 is sealed to the tubing spool 114 by an upper, preferably metal production seal ring 134 and a lower, preferably metal production seal ring 136, each of which engages a corresponding annular sealing surface formed on the central bore 116. Furthermore, the production bore 124 is sealed above the production passageway 126 by a suitable closure member 138, such as a wireline crown plug, which directs the flow of oil or gas from the tubing string 120 into the production passageway 126.

In accordance with the present invention, the tubing hanger 118 also includes an annulus bore 140 which extends between the top and the outer diameter of the tubing hanger, and the tubing spool 114 comprises a workover passageway 142 that extends between the annulus passageway 130 and the annulus bore 140. In this manner, communication between the tubing annulus 122 and the top of the tubing hanger 118 is provided by the annulus passageway 130, the workover passageway 142, and the annulus bore 140. As will be described below, this arrangement will permit communication between the tubing annulus 122 and a BOP to be routed through a THRT, rather than into the portion of the central bore 116 above the tubing hanger 118.

Similar to the flow completion assembly 10, the flow completion apparatus 110 may also comprise a production master valve 144 and a production wing valve 146 to control flow through the production outlet 128, and an annulus master valve 148, an annulus wing valve 150 and a workover valve 152 to control flow through the annulus passageway 130, the annulus outlet 132 and the workover passageway 142, respectively. While these valves may be any suitable closure members, they are preferably remotely operable gate valves. Moreover, some or all of the valves may be incorporated into the body of the tubing spool 114, into separate valve blocks which are bolted onto the tubing spool, or into individual valve assemblies which are connected to their respective outlets or passageways in the tubing spool with separate lengths of conduit. Furthermore, the production outlet 128 and the annulus outlet 132 are preferably connected to respective flow loops which communicate with a surface vessel, either directly or via a manifold, in a manner that is well known in the art.

In the production mode of operation of the flow completion apparatus 110, which is depicted in FIG. 3, a first barrier between the well bore and the environment is provided by the upper production seal 134 and the closure member 138, which together serve to isolate the fluid in the production bore from the environment above the tubing hanger. In accordance with the present invention, a second barrier between the well bore and the environment is provided by a suitable secondary closure member 154, such as a wireline crown plug, which is mounted in the production bore 124 above the closure member 138, and a secondary, preferably metal ring seal 156, which is mounted on the tubing hanger and sealingly engages a corresponding annular sealing surface formed in the central bore 116. Together, the secondary closure member 154 and the secondary seal ring 156 function to isolate the fluid in the production bore from the environment above the tubing hanger. Thus, the necessary first and second barriers for isolating the production bore from the environment are provided by components which are mounted on or in the tubing hanger.

The present invention also provides for isolating the tubing annulus 122 from the environment above the tubing hanger 118 during the production mode of operation. Provided the annulus master valve 148 and the workover valve 152 are closed, the upper production seal 134 and the secondary seal 156 will provide the required first and second barriers between the tubing annulus and the environment. However, when pressure in the tubing annulus 122 needs to be bled off through the annulus passageway 130 and the annulus outlet 132, or when gas is introduced into the tubing annulus through the annulus outlet and the annulus passageway during gas lift applications, the annulus master valve 148 must be opened.

Therefore, the flow completion apparatus preferably also comprises a tree cap 158 which includes an annulus stab 160 that seals into the top of the annulus bore 140 to provide a second barrier, in conjunction with the workover valve 152, between the tubing annulus 122 and the environment when the annulus master valve 148 is open. While the tree cap 158 may include an annular, preferably non-metallic seal (not shown) to seal against the tubing spool 114 and thereby prevent sea water from entering the central bore 116, the tree cap is not intended to provide a barrier against well pressure in the production bore. Consequently, the tree cap 158 is a relatively lightweight member which can be installed using an ROV, thus eliminating the need to install the tree cap from a surface vessel. The tree cap 158 is preferably landed on the tubing hanger 118 and locked to the tubing spool 114 with a conventional lockdown mechanism 162. This lockdown mechanism will provide a backup to the lockdown mechanism used to secure the tubing hanger to the tubing spool. It should be noted that, although the tree cap 158 is depicted as an internal tree cap, it could instead be configured as an external tree cap. Also, although not shown in the drawings, the tree cap 158 could be locked directly to the tubing hanger 118 rather than the tubing spool 114.

Figure 4:
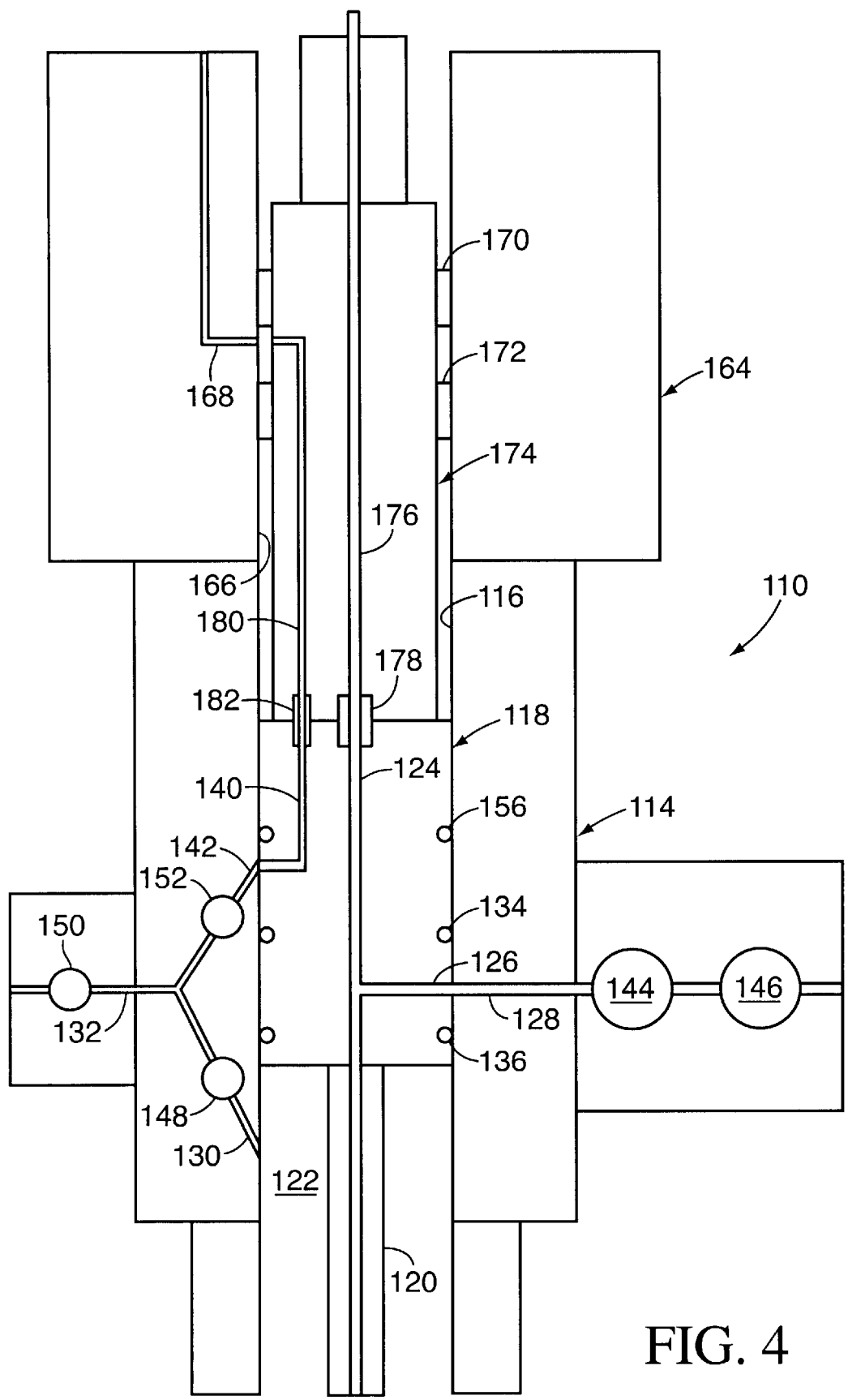
FIG. 4 is a representation of the flow completion apparatus of FIG. 3 shown in the installation or workover mode of operation with a first embodiment of a BOP connected to the tubing spool.

Referring now to FIG. 4, during installation and workover of the flow completion apparatus 110, a BOP 164 is lowered on a riser (not shown) and connected and sealed to the top of the tubing spool 114. The BOP 164 includes an internal BOP bore 166, at least one choke and kill line 168 and, in the embodiment of the invention shown in FIG. 4, preferably two sets of BOP rams or bags 170 and 172. In addition, a THRT 174 is connected to the top of the tubing hanger 118. The THRT is either connected to the tubing hanger at the surface vessel and used to lower the tubing hanger into the tubing spool during installation of the tubing hanger, or lowered through the riser and the BOP and connected to the tubing hanger in the tubing spool in anticipation of a workover operation. The THRT 174 is shown to comprise a generally cylindrical outer diameter surface, a production port 176 which is connected to the production bore 124 by a suitable production seal stab 178, and an annulus port 180 which extends from a portion of the outer diameter surface to a suitable annulus seal stab 182 that engages the tubing hanger annulus bore 140.

Thus, with the BOP rams 170, 172 sealed against the THRT 174, communication between the tubing annulus 122 and the BOP choke and kill line 168 may be established through the annulus passageway 130, the workover passageway 142, the annulus bore 140, the annulus port 180, and the portion of the BOP bore 166 which is located between the BOP rams 170, 172. For example, with the annulus wing valve 150 closed, pressure can be transmitted from the surface vessel down the choke and kill line 168, through the annulus port 180, through the tubing hanger annulus bore 140, through the workover passageway 142, through the annulus passageway 130, and into the tubing annulus 122 to test the integrity of the down hole packer (not shown). Also, deep well circulation can be accomplished by closing both the annulus wing valve 150 and the production master valve 144 and pumping fluid down the choke and kill line 168, through the annulus port 180, through the annulus bore 140, through the workover passageway 142, through the annulus passageway 130, down the tubing annulus 122, past the down hole packer, up the tubing string 120, through the production bore 124, and up the production port 176. Moreover, since the flow between the tubing hanger annulus bore 140 and the choke and kill line 168 is restricted by the THRT, no possibility exists that the flow will foul the tubing hanger lockdown mechanism or erode the central bore 116.

Figure 5:
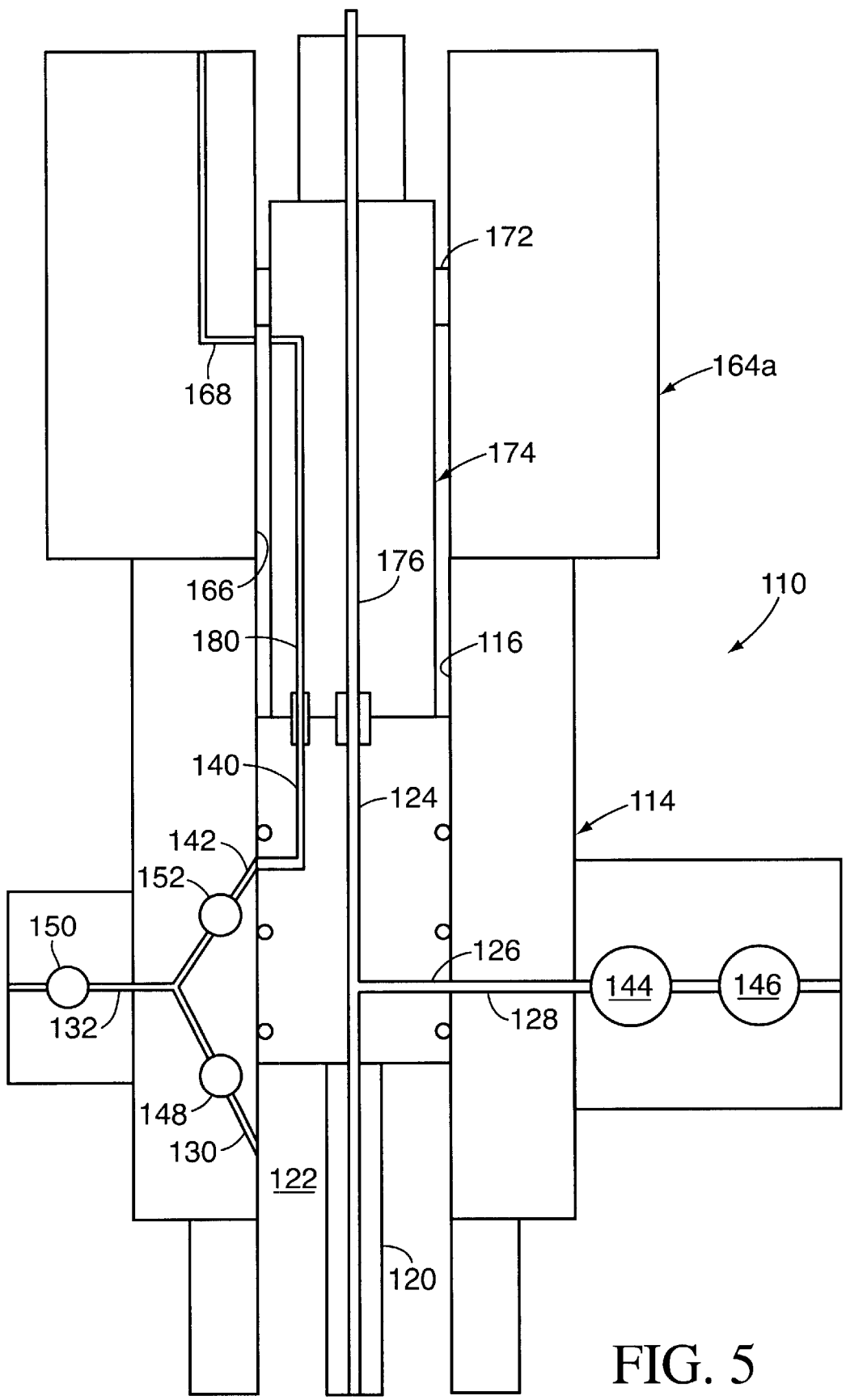
FIG. 5 is a representation of the flow completion apparatus of FIG. 3 shown in the installation or workover mode of operation with a second embodiment of a BOP connected to the tubing spool.

Referring now to FIG. 5, the flow completion apparatus 110 is shown connected to a BOP 164a, which is different from the BOP 164 described above in that the choke and kill line 168 of BOP 164a enters the BOP bore 166 below a single or the lower set of BOP rams 172. In this embodiment, fluid communication between the tubing annulus 122 and the choke and kill line 168 is established by the annulus passageway 130, the workover passageway 142, the annulus bore 140, the annulus port 180, and the portion of the BOP bore 166 which is located below the BOP rams 172. While this arrangement allows the fluid to contact the central bore 116 above the tubing hanger 118, once the annular area between the THRT 174 and the central bore is filled with fluid, this area becomes in effect a "dead zone" through which the fluid will not flow with any intensity. Therefore, the flow of fluid will essentially be restricted to the portion of the BOP bore 166 which is proximate the area where both the choke and kill line 168 and the annulus port 180 enter the BOP bore. Consequently, this fluid flow arrangement will not subject the central bore 116 to undue erosion.

Figure 6:
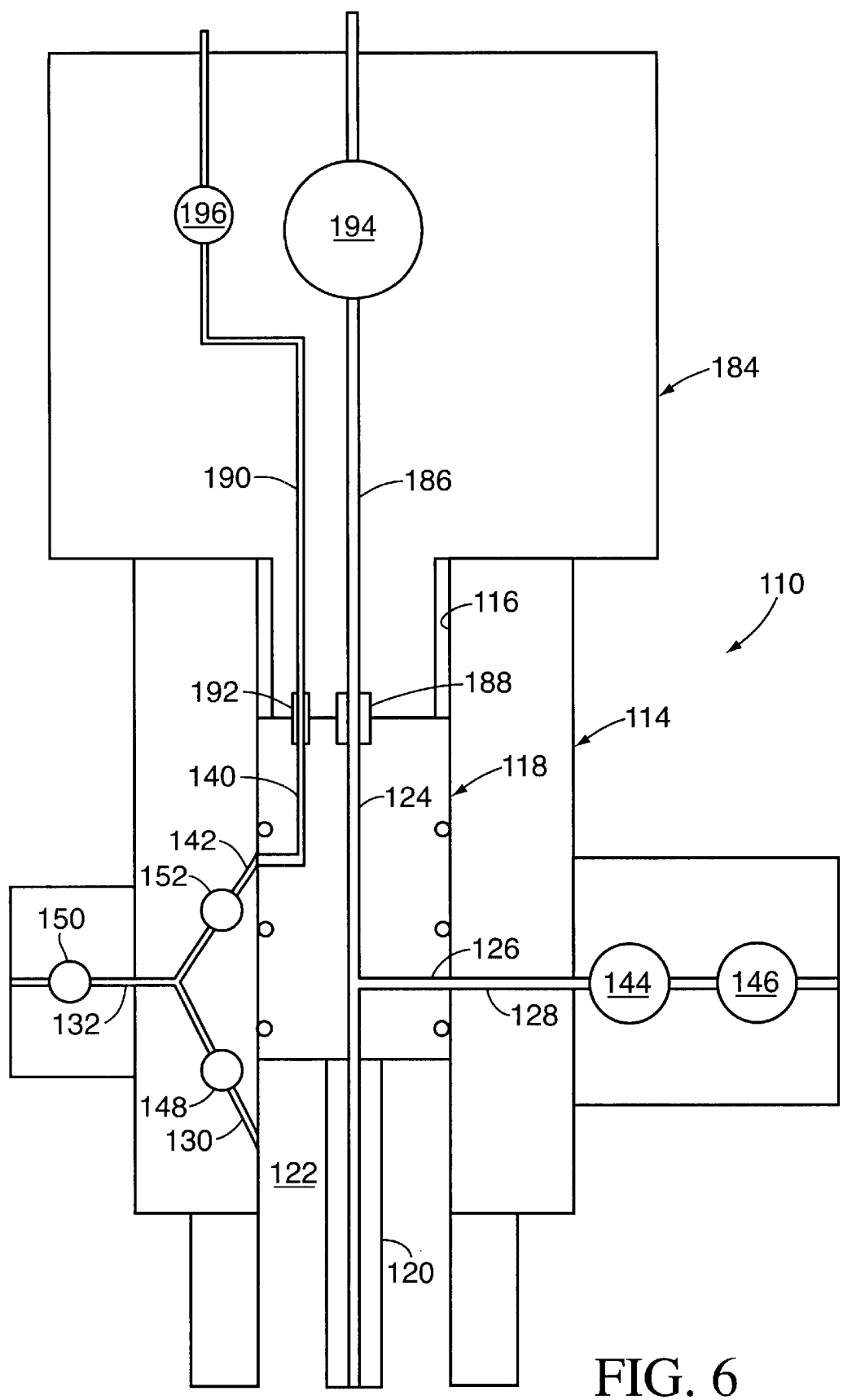
FIG. 6 is a representation of the flow completion apparatus of FIG. 3 shown with a light weight intervention package connected to the tubing hanger.

Referring to FIG. 6, the flow completion apparatus 110 is shown in conjunction with a light well intervention package 184, which is typically used to monitor the tubing annulus 122 and service the well from a workover vessel. After the tree cap 158 is removed, the intervention package 184 is landed and sealed to the top of the tubing spool 114. The intervention package 184 includes a production bore 186, which is connected to the production bore 124 by a suitable production seal stab 188, and an annulus port 190, which is connected to the tubing hanger annulus bore 140 by a suitable annulus seal stab 192. The intervention package also comprises a production closure member 194 for controlling flow through the production bore 186 and an annulus closure member 196 for controlling flow through the annulus port 190. While the closure members 194, 196 may be any suitable valves, they are preferably remotely operable gate valves. In addition, at least the production closure member 194 is preferably a wire shearing gate valve.

As shown in FIG. 6, fluid communication between the tubing annulus 122 and the annulus port 190 in the intervention package 184 is established by the tubing hanger annulus bore 140, the workover passageway 142 and the annulus passageway 130. Consequently, the central bore 116 above the tubing hanger 118 is isolated from the fluid flow. Therefore, the central bore will not be subject to erosion while service operations are being performed with the intervention package 184.

Figure 7:
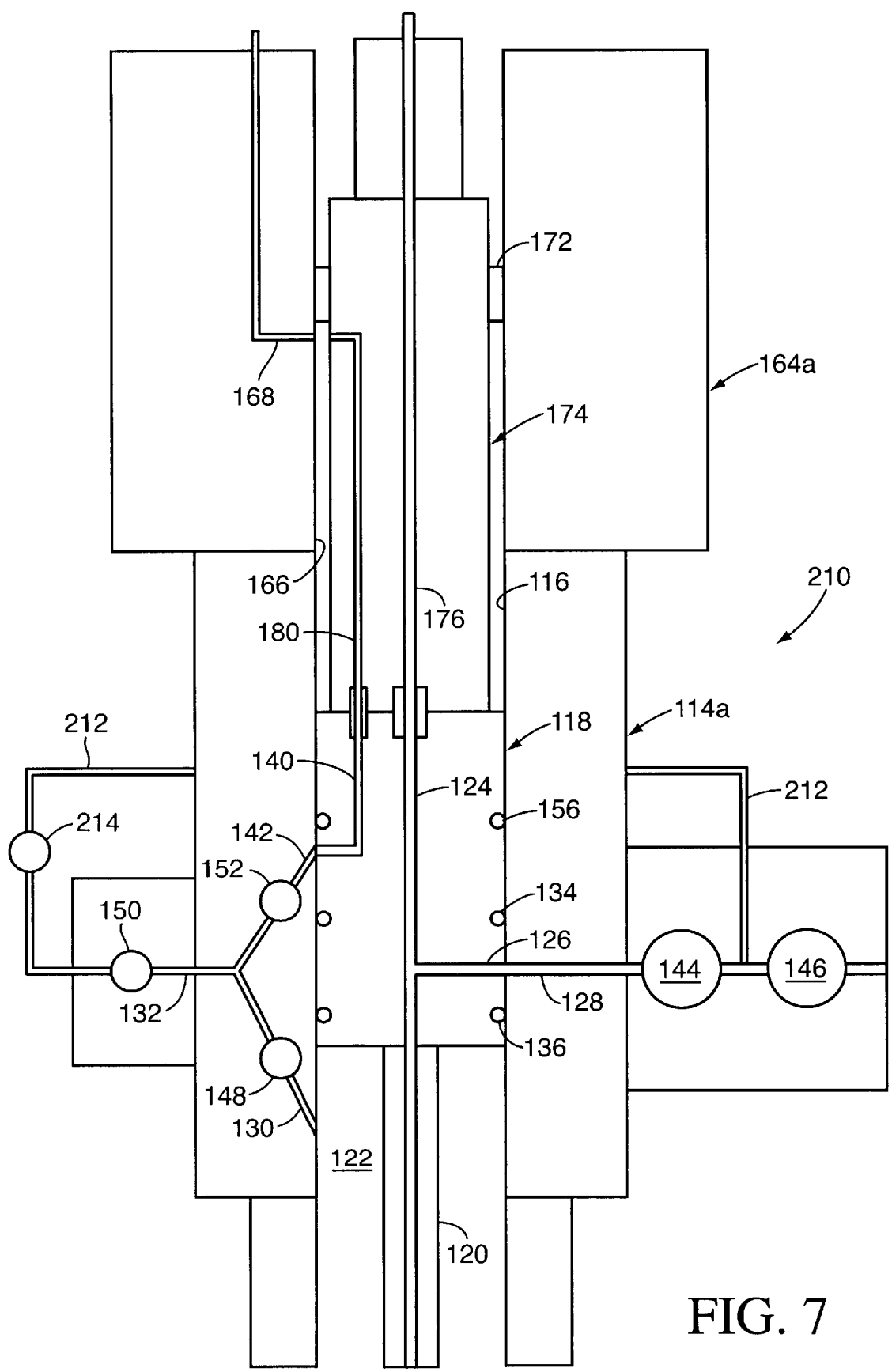
FIG. 7 is a representation of a second embodiment of the flow completion apparatus of the present invention shown in the installation or workover mode of operation.

Another embodiment of a flow completion apparatus according to the present invention is shown in FIG. 7. The flow completion apparatus of this embodiment, which is indicated generally by reference number 210, is shown to comprise all of the elements of the flow completion apparatus 110 discussed above. However, the tubing spool 114a of the flow completion apparatus 210 also includes a crossover flow loop 212 extending between the annulus outlet 132 and a portion of the production outlet 128 that is preferably located between the production master valve 144 and the production wing valve 146. In addition, the flow completion apparatus 210 comprises a suitable crossover valve 214, such as a remotely operable gate valve, to control the flow through the crossover flow loop 212.

With this arrangement, the flow completion apparatus 210 is capable of providing communication between a surface vessel and either the tubing annulus 122 or the production bore 124. With the annulus wing valve 150 closed, an annulus communication path can be established through the BOP choke and kill line 168, the annulus port 180, the annulus bore 140, the workover passageway 142, and the annulus passageway 130. Furthermore, with the annulus master valve 148 and the production wing valve 146 both closed, a production bore communication path can be established through the BOP choke and kill line 168, the THRT annulus port 180, the tubing hanger annulus bore 140, the workover passageway 142, the annulus outlet 132, the crossover flow loop 212, the production outlet 128, and the production passageway 126. Provided a down hole safety valve or similar closure member (not shown) is closed to seal off the production string 120, the production bore communication path can be used to circulate fluid up the production port 176 for riser washout operations. Provided further that the production port 176 is plugged, the production bore communication path can be used to pressure test the tubing hanger seals 134 and 136. Persons of ordinary skill in the art will recognize that other communication paths and other operations may also be achieved with the flow completion apparatus 210.

Figure 8:
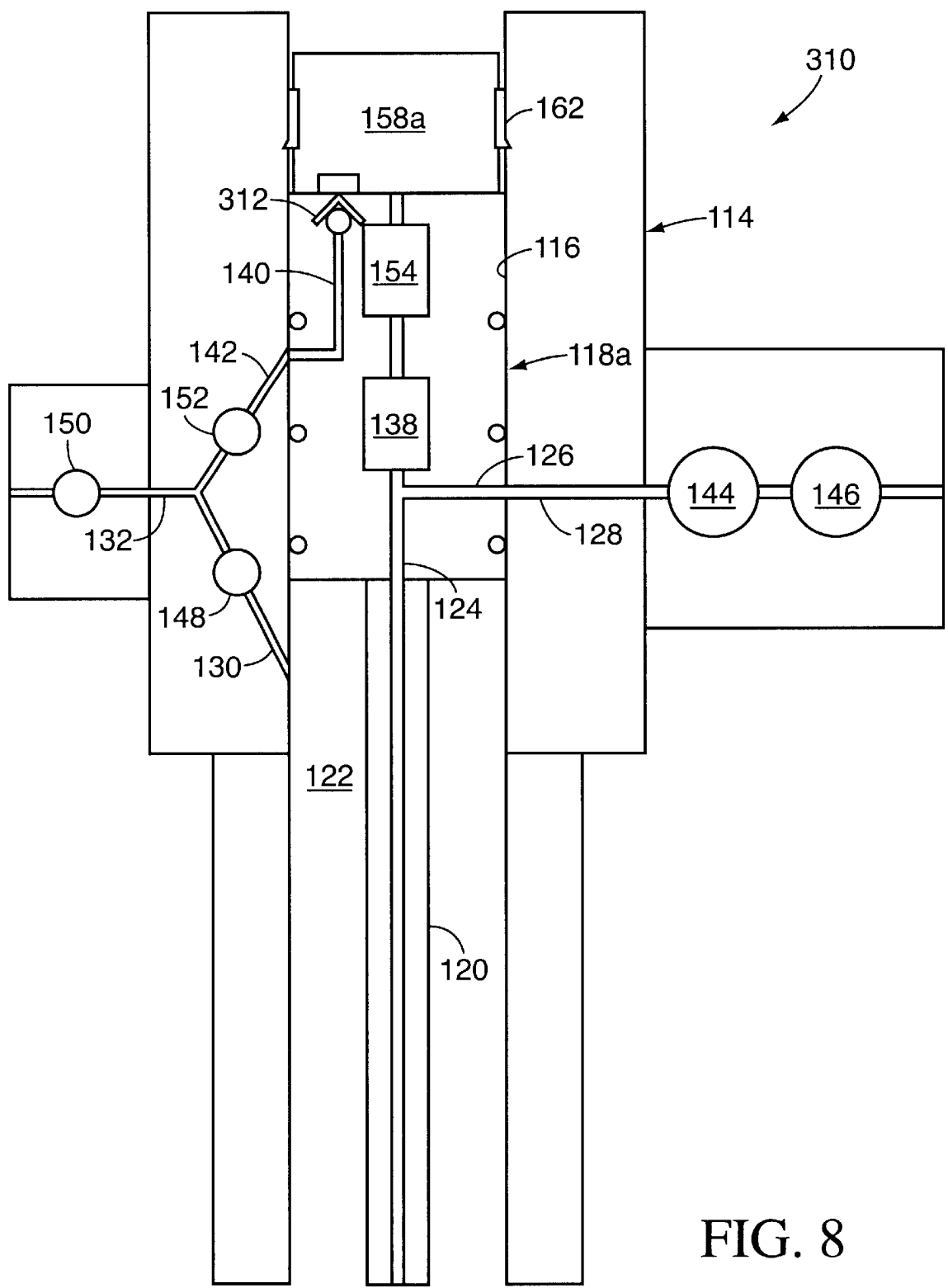
FIG. 8 is a representation of a third embodiment of the flow completion apparatus of the present invention shown in the production mode of operation.
Figure 9:
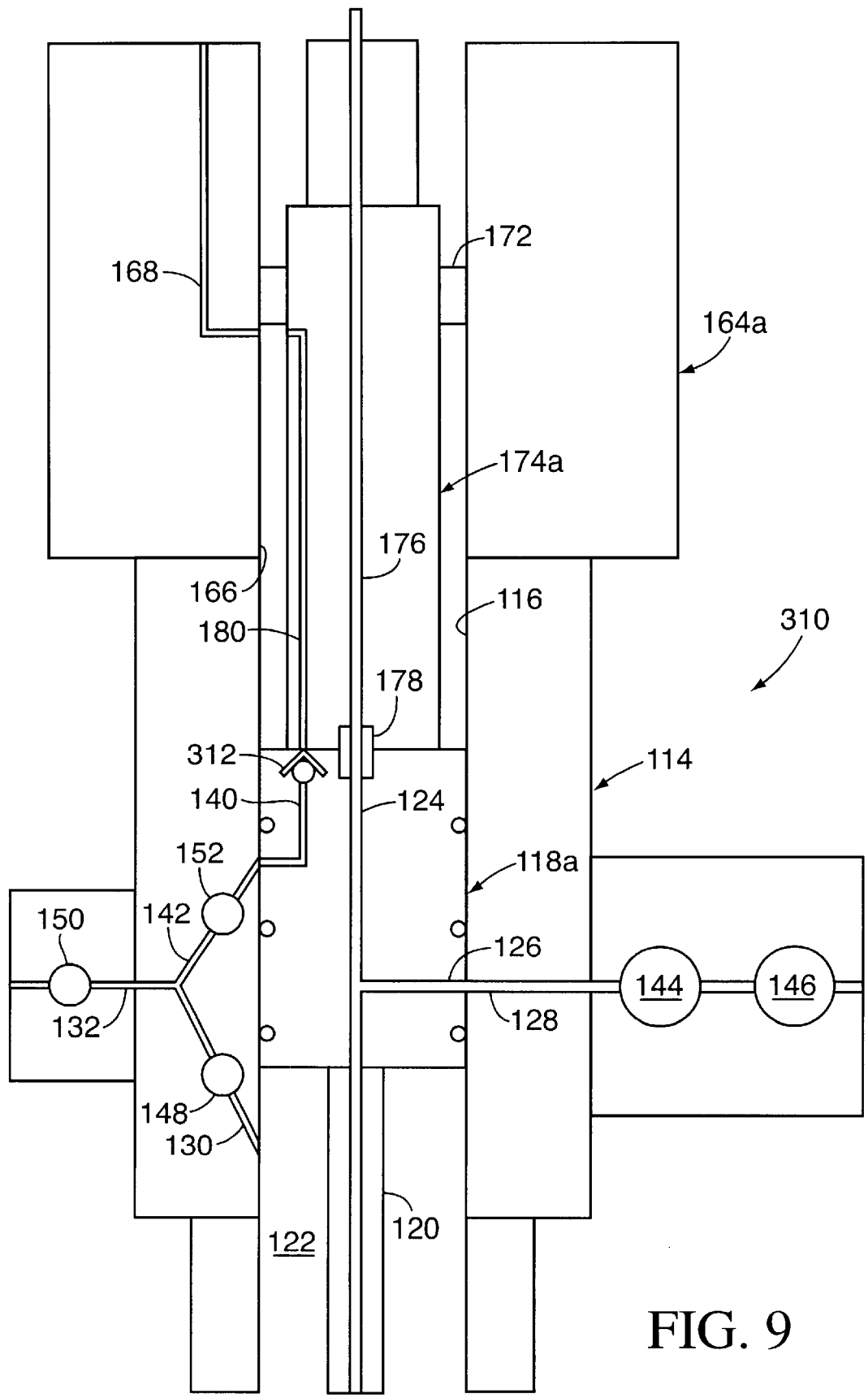
FIG. 9 is a representation of the flow completion apparatus of FIG. 8 shown in the installation or workover mode of operation.

Referring now to FIG. 8, another embodiment of a flow completion apparatus, which is indicated generally by reference number 310, is shown to comprise many of the same components as the flow completion apparatus 110 described above. In this embodiment, however, the tree cap 158a does not include an annulus seal stab 160 for sealing the top of the annulus bore 140. Rather, the tubing hanger 118a includes a sting open-type valve 312, such as a poppet valve, mounted in the upper end of the annulus bore 140 to close off communication with the tubing annulus 122 in the absence of an activating force applied from above, for example, by a THRT. During workover operations with the flow completion apparatus 310, which is illustrated in FIG. 9, a THRT 174a is lowered through the BOP 164a and landed on the tubing hanger 118a. Upon landing on the tubing hanger, the THRT will press down on the stem of the valve 312 and thereby open the valve. Fluid communication may thus established between the annulus bore 140 and the annulus port 180 in the THRT.

In a variation of the flow completion apparatus 310 which is not illustrated in any particular Figure, the male member of a conventional fluid coupling assembly could be mounted at the top of the tubing hanger annulus bore and the corresponding female member of the assembly mounted in the bottom of the THRT annulus port. Thus, when the THRT 174 is landed on the tubing hanger, the male and female coupling members will engage and a sealed fluid path will be established between the tubing hanger annulus bore and the THRT annulus port.

Figure 10:
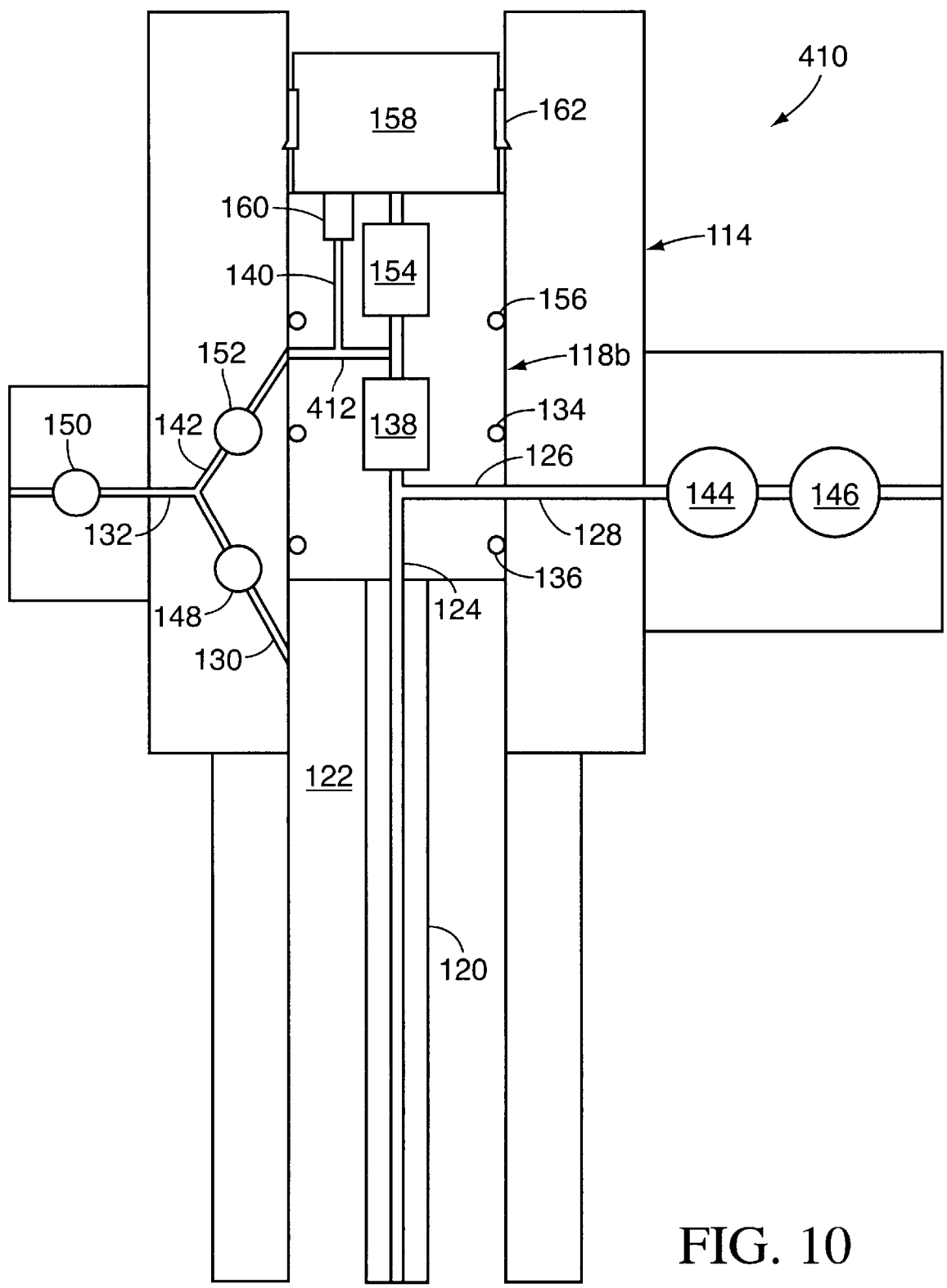
FIG. 10 is a representation of a fourth embodiment of the flow completion apparatus of the present invention shown in the production mode of operation.

Another embodiment of a flow completion apparatus according to the present invention is shown in FIG. 10. The flow completion apparatus of this embodiment, which is indicated generally by reference number 410, is similar to the flow completion apparatus 110 described above. However, tubing hanger 118b of this embodiment includes a crossover bore 412 extending between the annulus bore 140 and the portion of the production bore 124 between the two closure members 138, 154. In conjunction with a THRT such as 174 (not shown), and with the upper plug 154 removed and the workover valve 152 closed, the crossover bore 412 allows for circulation down the BOP choke and kill line (not shown), through the THRT annulus port (not shown), through the tubing hanger annulus bore 140, through the crossover bore 412, up the production bore 124, and up the production port (not shown). Other modes of circulation utilizing the crossover bore 412 may also be recognized by those skilled in the art. Moreover, during production a first barrier between the production bore and the environment is provided by the upper production seal 134 and the lower closure member 138, while a second barrier is provided by the upper production seal 156, the upper closure member 154, and the annulus seal stab 160 of the tree cap 158. Therefore, in addition to the advantages of the previous flow completion apparatuses discussed above, the flow completion apparatus 410 also facilitates certain circulation modes without the need for an external crossover flow loop.

Figure 11:
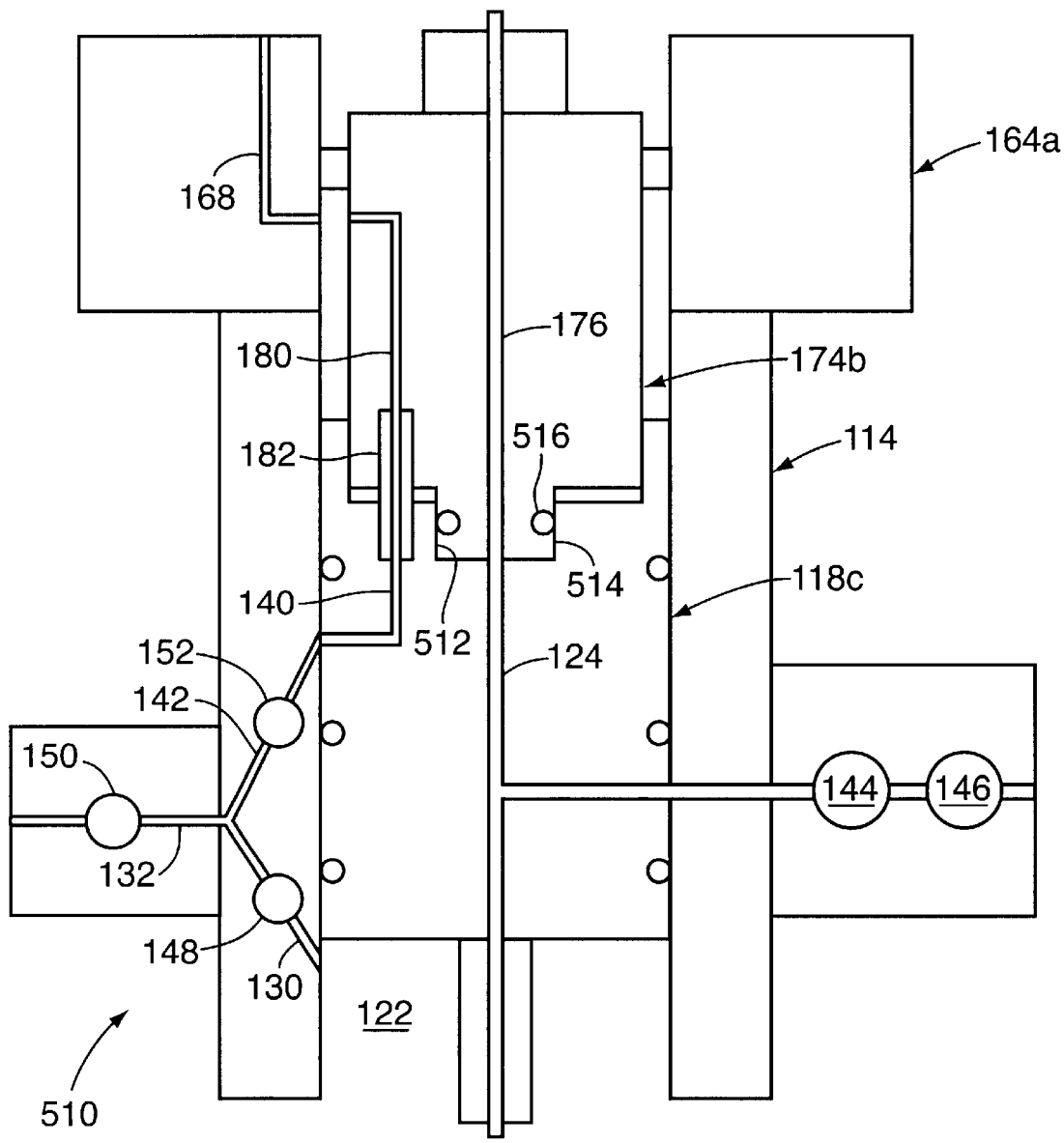
FIG. 11 is a representation of a fifth embodiment of the flow completion apparatus of the present invention shown in the installation or workover mode of operation.

FIG. 11 illustrates yet another embodiment of a flow completion apparatus in accordance with the present invention. The flow completion apparatus of this embodiment, generally 510, differs from the flow completion apparatus 110 described above in that the tubing hanger 118c includes a generally annular receptacle 512 formed at the top of the production bore 124, and the THRT 174b comprises a preferably integral stab 514 which depends downwardly from the bottom of the THRT around the production port 176. When the THRT is landed on the tubing hanger 118c, the stab 514 is received in the receptacle 512 to connect the production bore 124 to the production port 176. The THRT 174b ideally also comprises an annular, preferably non-metallic seal 516, for example surrounding the stab 514, for sealing the bottom of the THRT to the top of the tubing hanger 118c around the production bore 124 and the production port 176. In the embodiment illustrated in FIG. 11, fluid communication between the tubing hanger annulus bore 140 and the THRT annulus port 180 is established by an annulus seal stab 182 carried on the THRT. In this embodiment, fluid communication between the BOP choke and kill line 168 and the tubing annulus 122 is established as described above in reference to FIG. 5.

Figure 12:
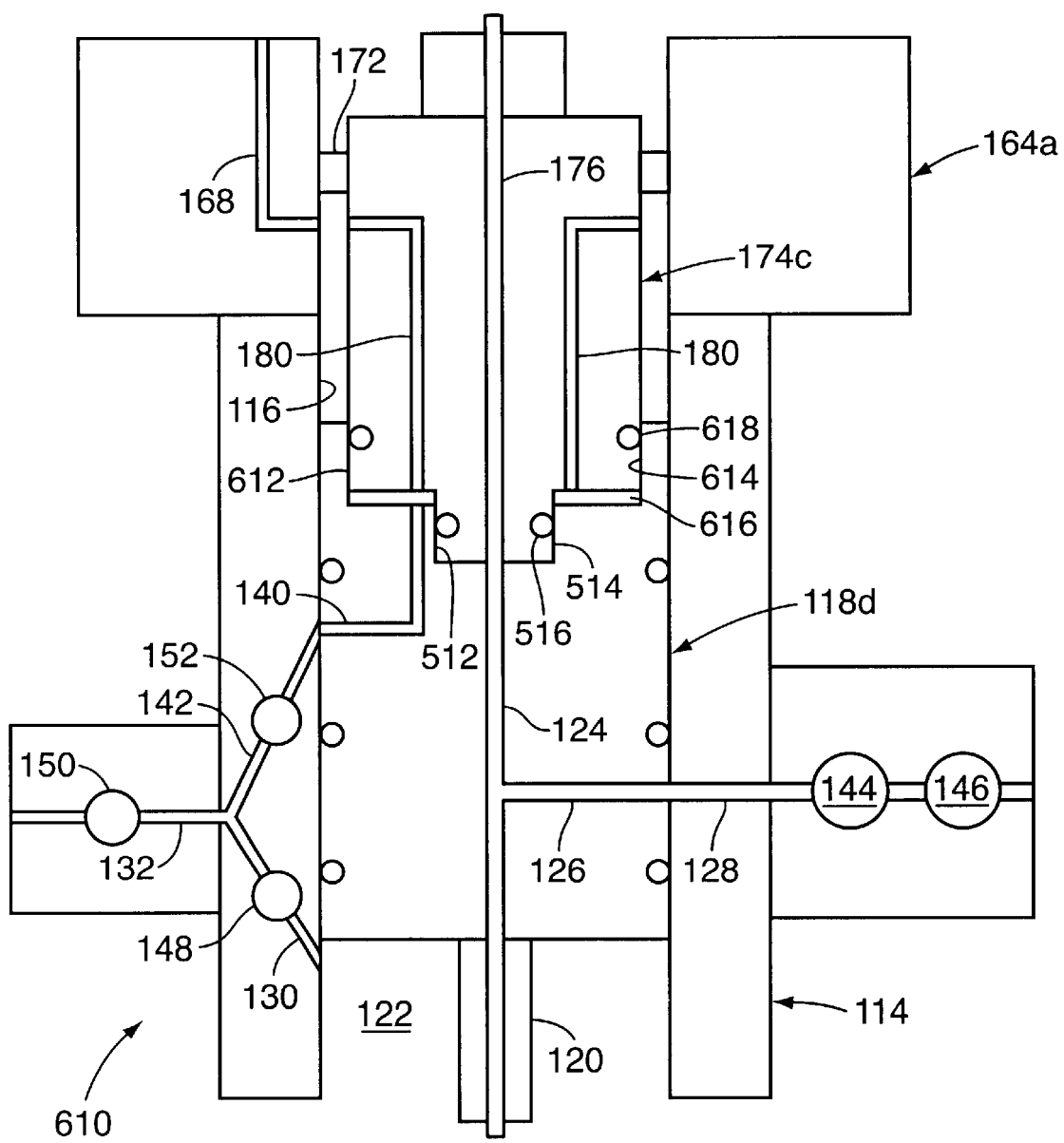
FIG. 12 is a representation of a sixth embodiment of the flow completion apparatus of the present invention shown in the installation or workover mode of operation.
Figure 13:
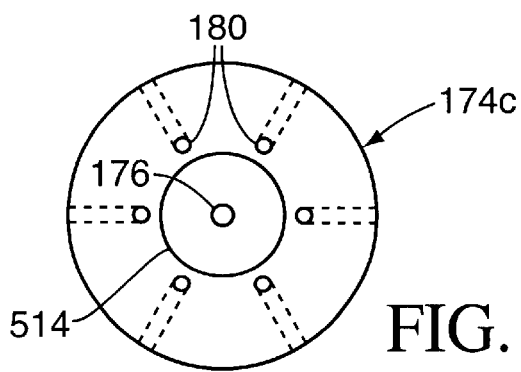
FIG. 13 is a bottom view of the THRT shown in FIG. 12.

Referring to FIGS. 12 and 13, another embodiment of a flow completion apparatus, generally 610, is shown to comprise many of the same features as the flow completion apparatus 510. However, the flow completion apparatus 610 does not comprise an annulus seal stab 182 between the THRT annulus port 180 and the tubing hanger annulus bore 140. Rather, the THRT 174c of this embodiment includes an annular lower body portion 612 which is located above the stab 514, and the tubing hanger 118d comprises an annular rim 614 which extends generally upwardly from the top of the tubing hanger. The rim 614 is adapted to receive the lower body portion 612 when the THRT is landed on the tubing hanger. Furthermore, the THRT 174c and the tubing hanger 118d are designed such that, when the THRT is fully engaged in the tubing hanger, an annular space or gallery 616 will be formed within the rim 614 between the bottom of the THRT and the top of the tubing hanger. In this manner, fluid communication between preferably multiple THRT annulus ports 180 and the tubing hanger annulus bore 140 is established through the gallery 616. The THRT 174c may also include an annular seal 618 around the lower body portion 612 to seal against the rim 614 and thereby more effectively isolate the annulus fluid flow. With the exception that the fluid flows between the THRT annulus ports 180 and the tubing hanger annulus bore 140 through the gallery 616, fluid communication between the BOP choke and kill line 168 and the tubing annulus 122 is as described above in reference to FIG. 5.

A preferred embodiment of the flow completion apparatus is shown in FIGS. 14–17. In this embodiment of the invention, the flow completion apparatus, which is indicated generally by reference number 710, is shown to comprise a tubing spool 712 which is secured and sealed to a wellhead housing 714 and which includes a central bore 716 extending axially therethrough, a tubing hanger 718 which is landed on a shoulder 720 that is located in the central bore, and a THRT 722 which is secured to the top of the tubing hanger during installation and workover operations. The tubing hanger 718 supports a tubing string 724 which extends into the well bore and defines a tubing annulus 726 surrounding the tubing string. As in the previous embodiments, the tubing hanger 718 includes a concentric production bore 728 which extends completely therethrough and communicates with the interior of the tubing string 724, a lateral production passageway 730 which extends between the production bore and the outer diameter of the tubing hanger, and an annulus bore 732 which extends between the outer diameter of the tubing hanger and the top of the tubing hanger. Similarly, the tubing spool 712 includes a production outlet 734 which communicates with the production passageway 730, an annulus passageway 736 which extends between the tubing annulus 726 and an annulus outlet 738, and a workover passageway 740 which communicates between the annulus outlet and the annulus bore 732. The production outlet 734 and the annulus outlet 738 are preferably connected to respective flow loops which communicate with a surface vessel, either directly or via a manifold, in a manner that is well known in the art.

The flow completion apparatus 710 also comprises a production master valve 742, an annulus master valve 744 and a workover valve 746 for controlling flow through the production outlet 734, the annulus passageway 736 and the workover passageway 740, respectively. These valve may be any suitable closure members, but are preferably remotely operable gate valves. Although not shown in the drawings, but similar to the previous embodiments described above, the tubing spool 712 preferably also includes a production wing valve located outboard of the production master valve 742 and an annulus wing valve positioned in the annulus outlet 738. Furthermore, the tubing spool 712 may also comprise a crossover flow loop and a crossover valve similar to that described with reference to FIG. 7. Moreover, some or all of the above-mentioned valves may be incorporated into the body of the tubing spool 712, into separate valve blocks which are bolted onto the tubing spool, or into individual valve assemblies which are connected to their respective outlets or passageways in the tubing spool with separate lengths of conduit.

Figure 14:
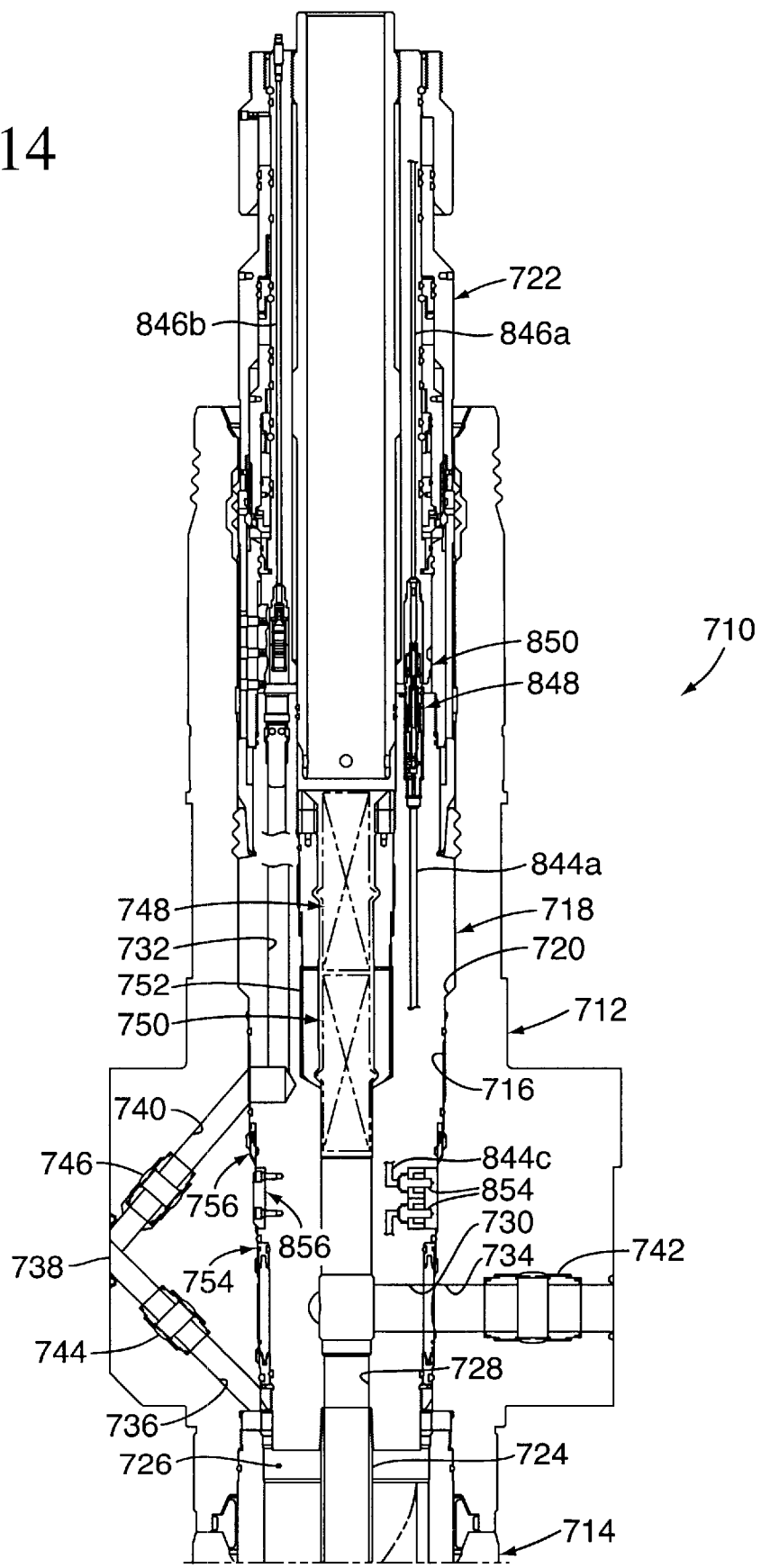
FIG. 14 is a longitudinal cross-sectional view of yet another embodiment of the flow completion apparatus of the present invention shown in the installation mode.

During the production mode of operation of the flow completion assembly 710, which is not shown in the drawings, the production bore 728 is sealed above the production passageway 730 by suitable upper and lower closure members 748 and 750, which are shown in phantom in FIG. 14. The closure members 748, 750 are preferably wireline crown plugs which are received in corresponding profiles that are formed in a bore insert 752 that is secured and sealed in the upper portion of the production bore 728. In addition, a test port (not shown) is ideally routed between the two plugs in a conventional fashion to prevent the creation of a hydraulic lock during installation of the upper plug and to facilitate the testing of both plugs after they are installed. A first pressure-containing barrier between the well bore and the environment above the tubing hanger 718 is provided by the lower closure member 750 and an annular upper production seal 754 which is positioned between the tubing hanger and the central bore 716 above the production passageway 730. A second pressure-containing barrier between the well bore and the environment is provided by the upper closure member 748 and an annular secondary seal 756 which is positioned between the tubing hanger and the central bore above the upper production seal 754. Thus, both of the required first and second pressure-containing barriers are mounted in or on the tubing hanger in the preferred embodiment of the invention.

As shown more clearly in FIG. 15, the upper production seal 754 is ideally part of a seal assembly 758 that also includes an annular lower production seal 760 which is positioned between the tubing hanger 718 and the central bore 716 below the production passageway 730. Each production seal 754, 760 preferably comprises a straight bore-type metal seal with an inner radial sealing lip that engages the tubing hanger and an outer radial sealing lip that engages a corresponding annular sealing surface 762 which is formed on the central bore 716. In addition, the production seals 754, 760 are optimally oriented so that the sealing lips will be energized into engagement with their corresponding sealing surfaces by the pressure in the production passageway 730. The production seals are spaced apart on the tubing hanger 718 by a spacer ring 764, which includes a lateral hole 766 that aligns with the production passageway 730, and the entire seal assembly 758 is secured to the tubing hanger by a retainer ring 768. Furthermore, in the embodiment of the invention shown in FIG. 15, the seal assembly 758 includes an upper backup seal ring 770, which is mounted in a corresponding groove formed in the tubing hanger above the upper production seal 754, and a lower backup seal ring 772, which is mounted in a corresponding groove formed in the body of the lower production seal 760. While, the backup seal rings 770, 772 may be any suitable seals, they are preferably non-metallic face-type seals.

Figure 15:
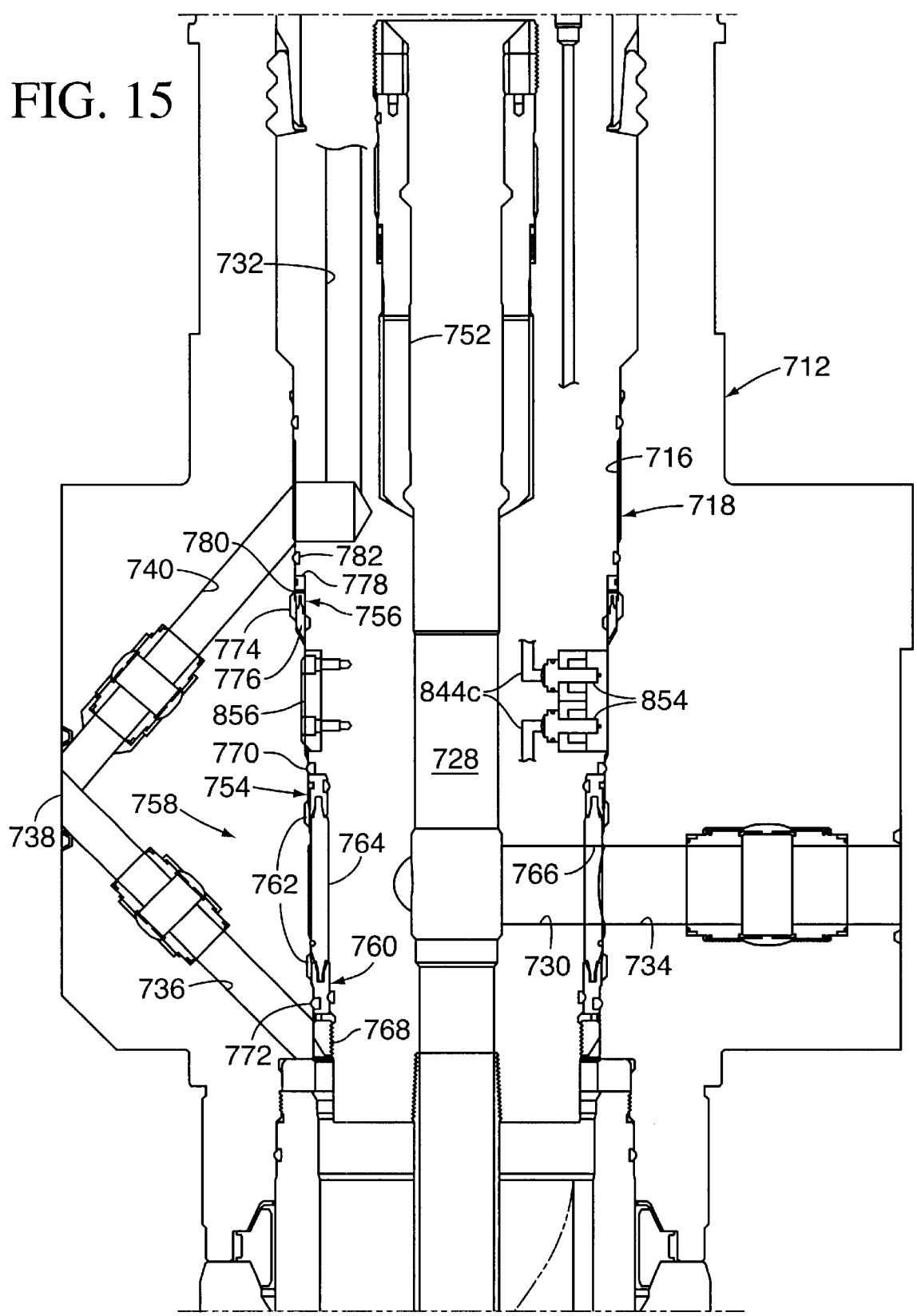
FIGS. 15 through 17 are enlarged views of portions of the flow completion apparatus shown in FIG. 14.

Referring still to FIG. 15, the secondary seal 756 preferably comprises a straight bore-type metal seal with an inner radial sealing lip that engages the tubing hanger and an outer radial sealing lip that engages a corresponding annular sealing surface 774 which is formed on the central bore 716. Moreover, the secondary seal is ideally oriented so that the sealing lips will be energized by the pressure in the production passageway 730 should the upper production seal 754 fail. A T-ring 776 is provided to secure the secondary seal 756 against a lateral step 778 that is formed in the outer diameter of the tubing hanger 718. The T-ring includes a stem which extends between the sealing lips and engages a base 780 of the secondary seal to force the secondary seal firmly against the step as the T-ring is threaded onto the tubing hanger. Furthermore, flow completion apparatus 710 may comprise a secondary backup seal ring 782 that is mounted in a corresponding groove formed in the tubing hanger above the secondary seal 756. The secondary backup seal ring may be, for example, a non-metallic face-type seal.

Figure 16:
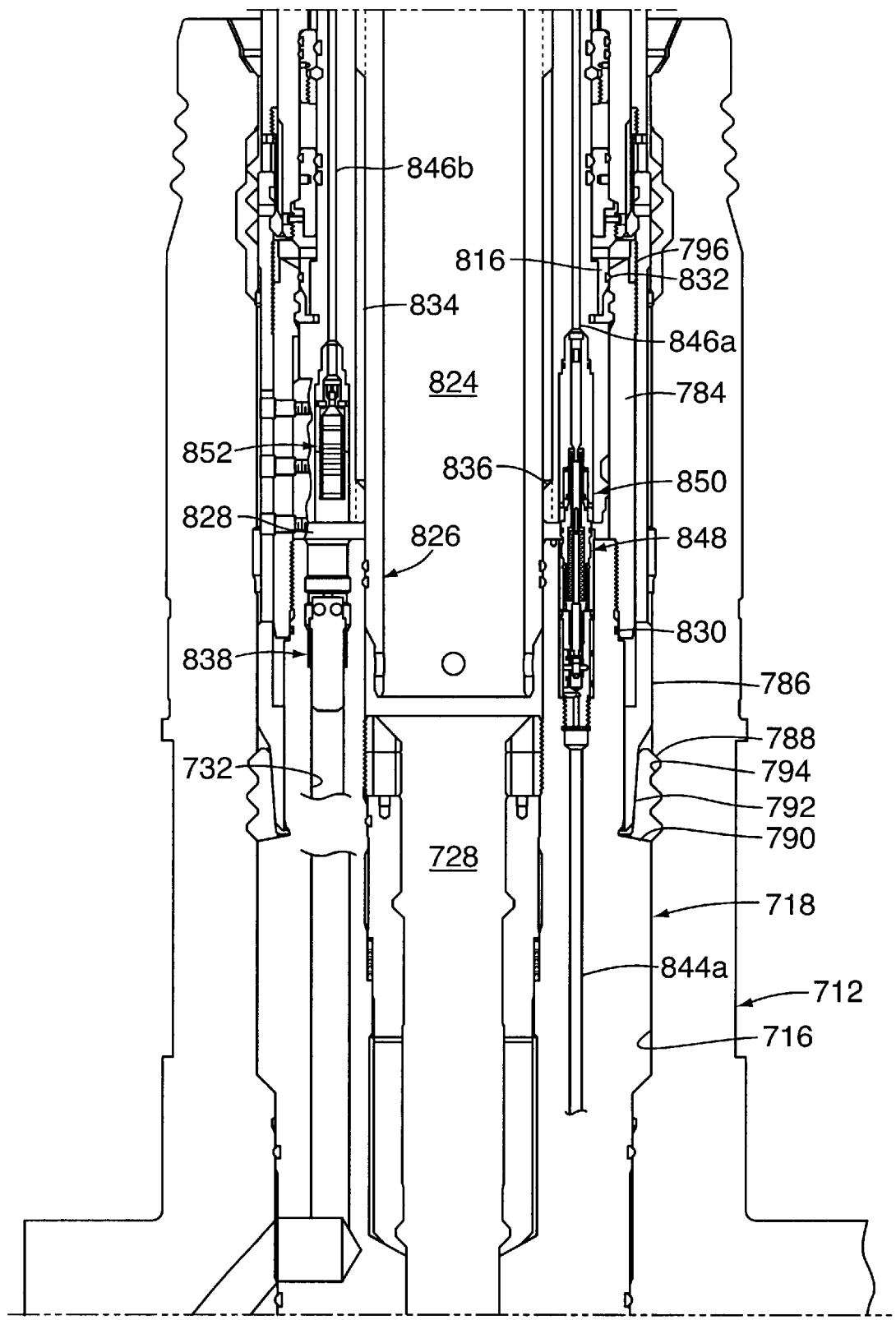

Referring to FIG. 16, the tubing hanger 718 is provided with a cylindrical upper extension or rim 784 that is threaded onto the upper end of the tubing hanger, a locking mandrel 786 which is telescopically received over the rim, and an expandable lock ring 788 which is carried on an annular shoulder 790 that is formed on the outer diameter of the tubing hanger. The lower end of the locking mandrel 786 comprises a wedge-shaped nose 792 which, when the mandrel is forced downward by the THRT 722, is adapted to urge the lock ring 788 outward into a corresponding locking profile 794 formed in the central bore 716 to thereby lock the tubing hanger to the tubing spool 712. An anti-backoff ring 796 which is secured to the upper end of the rim 784 includes a serrated outer surface that engages a corresponding grooved surface on the inner diameter of the locking mandrel 786 to maintain the locking mandrel in the locked position.

Figure 17:
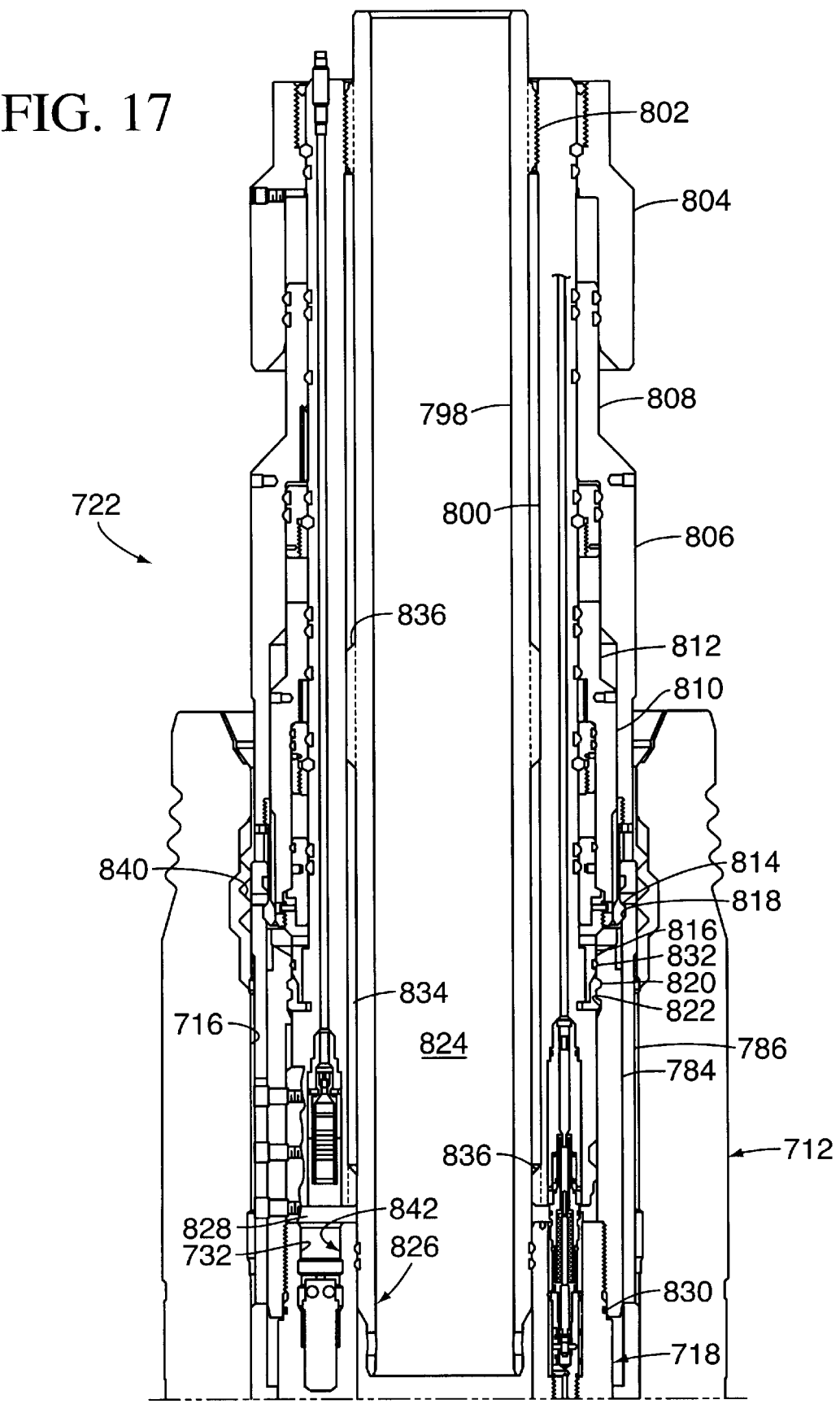

As seen most clearly in FIG. 17, the THRT 722 comprises a tubular member 798 having an upper end which is connected to a string of drill pipe or the like (not shown), a cylindrical body 800 which is mounted on the tubular member 798 and secured thereto by suitable means, such as threads 802, an annular retention sleeve 804 which is secured to the upper end of the body 800, a first cylindrical locking piston 806 which includes a first sleeve portion 808 that is slidably received over the body 800 below the retention sleeve 804, and a second cylindrical locking piston 810 which includes a second sleeve portion 812 that is slidably received over the body 800 below the first sleeve portion 808. A collet finger ring 814 is attached to the lower end of the first locking piston 806, and a wedge ring 816 is attached to the lower end of the second locking piston 810.

In operation, the THRT 722 is lowered onto the tubing hanger 718 until the bottom of the first locking piston 806 engages the top of the locking mandrel 786 and the collet fingers 814 spring into a corresponding groove 818 formed on the inner diameter of the locking mandrel. The second locking piston 810 is then stroked downward to trap the collet fingers 814 in the groove 818 and thereby lock the first locking piston 806 to the locking mandrel 786. Simultaneously, the wedge ring 816 will force an expandable locking ring 820 into a corresponding groove 822 formed on the inner diameter of the rim 784 to thereby lock the THRT 722 to the tubing hanger 718. Once the tubing hanger is landed in the tubing spool 712, the first locking piston 806 is stroked downward to force the locking mandrel 786 downward, and this will force the lock ring 788 into the locking profile 794 to thereby lock the tubing hanger to the tubing spool, as was described above in connection with FIG. 16. The second locking piston 810 is then stroked upward to unlock the THRT 722 from the tubing hanger. This will also unlock the collet fingers 814 from the locking mandrel 786 and therefore allow the THRT to be retrieved while the locking mandrel remains in the locked position. The tubing hanger 718 can also be retrieved using the THRT 722 by connecting the THRT to the tubing hanger as described above and then stroking the first locking piston 806 upward to pull the locking mandrel 786 upward and thereby allow the lock ring 788 to retract out of the locking profile 794.

As shown in FIGS. 16 and 17, the THRT 722 comprises a production port 824 within the tubular member 798 which communicates with a riser (not shown) in a manner well understood by those of skill in the art. In addition, the bottom of the tubular member forms a production seal stab 826 which, when the THRT is connected to the tubing hanger 718, is received in the top of the production bore 728 to connect the production port 824 with the production bore.

Furthermore, when the THRT 722 is connected to the tubing hanger 718, the bottom of the body 800 is spaced apart from the top of the tubing hanger to thereby form an annular gallery 828 which is in communication with the tubing hanger annulus bore 732. The gallery 828 is sealed from the environment by a lower annular isolation seal 830, which is engaged between the tubing hanger 718 and the rim 784, and an upper annular isolation seal 832, which is engaged between the rim and the outer diameter of the wedge ring 816. The seals 830, 832 may be any suitable seals, but are preferably non-metallic face seals. The outer diameter of the tubular member 798 is designed to be smaller than the inner diameter of the body 800 in order to form an annular volume or "annulus port" 834 between these two members which extends between the gallery 828 and the top of the body. The spacing between the tubular member and the body is ideally maintained by a number of fluted centralizers 836 which may be attached to or formed integrally with either the tubular member or the body. Moreover, the threads 802 which secure the body 800 to the tubular member 798 are fluted to allow for fluid to pass through this connection.

In this manner, when a BOP (not shown) is connected to the tubing spool 712 and the BOP rams are closed around the tubular member 798, fluid communication between the BOP choke and kill line and the tubing hanger annulus bore 732 is established through the annulus port 834 and the gallery 828. If the BOP choke and kill line enters the BOP bore below the BOP rams, then fluid communication between the BOP choke and kill line and the tubing annulus 726 may be established in a manner similar to those described above in connection with FIGS. 5 and 12, and various fluid circulation paths may be formed through the flow completion apparatus 710 as described, for example, in connection with FIGS. 5 and 7. If, however, the BOP choke and kill line enters the BOP bore between two sets of BOP rams, then fluid communication between the BOP choke and kill line and the tubing annulus 726 may be established in a manner similar to that described above in connection with FIG. 4.

Referring again to FIG. 16, the flow completion apparatus 710 preferably also includes a debris valve 838 to allow fluid to pass through the annulus bore 732 but prevent debris from falling into the annulus bore when the THRT 722 is removed from the tubing hanger 718. The construction and operation of the debris valve are explained more fully in applicants' co-pending U.S. patent application Ser. No. 09/815,436 filed on Mar. 22, 2001, which is hereby incorporated herein by reference.

While in the production mode, the flow completion apparatus 710 may comprise a tree cap similar to the tree cap 158 described above. Accordingly, as shown most clearly in FIG. 17 the central bore 716 preferably includes a locking profile 840 against which the tree cap lockdown mechanism may engage, and the top of the annulus bore ideally includes a seal profile 842 against which the tree cap annulus stab may seal.

Referring again to FIG. 14, the flow completion apparatus preferably comprises a number of service and control conduits which are arranged radially about the central axis of the tubing hanger. The service and control conduits are bores which are formed in the body of the tubing hanger 718 from either the top or the outer diameter of the tubing hanger and which extend into or completely through the tubing hanger. The service and control conduits primarily function to provide access into or through the tubing hanger from positions above or radially outside the tubing hanger. For example, the service and control conduits may comprise a number of fluid transfer ports for communicating hydraulic control fluid to valves or other known devices located in or below the tubing hanger. In addition, the service and control conduits may include one or more fluid transfer ports for conveying chemicals or other well service fluids through the tubing hanger to select downhole locations. Also, the service and control conduits may comprise a number of signal transfer ports which accommodate electrical, optical or similar cables for conveying power to corresponding devices positioned in or below the tubing hanger.

In the embodiment of the invention depicted in FIG. 14, for example, a service and control conduit 844a for providing hydraulic control fluid to a surface controlled subsea safety valve ("SCSSV") (not shown) which is positioned in the tubing string 724 is coupled to a corresponding conduit 846a located in the THRT 722. The conduit 846a in turn is connected to a control panel on the surface vessel so that the status of the SCSSV may be monitored during installation of the tubing hanger 718. The conduits 844a, 846a may be releasably coupled using a conventional poppet-type fluid coupling. However, as shown more clearly in FIG. 16, the conduit 844a may alternatively be connected to a male coupling 848 which comprises a combination poppet and gate valve, such as is described more fully in applicants' co-pending U.S. patent application Ser. No. 09/844,579 filed on Apr. 26, 2001, which is hereby incorporated herein by reference. In addition the conduit 846a is connected to a female coupling 850 which forms a part of a standard hydraulic coupling. In this manner, the coupler 848 will provide two barriers between the conduit 844a and the environment.

In a similar fashion, a service and control conduit in the tubing hanger (not shown) may provide an electrical conduit to a pressure sensor (not shown) located in the tubing annulus 726. This conduit would be connected to a corresponding conduit 846b in the THRT 722, which in turn would be connected to the control panel located on the surface vessel so that the pressure in the tubing annulus can be monitored during installation of the tubing hanger 718. These conduits are preferably releasably connected using a conventional electrical coupler, the female portion 852 of which is shown in FIG. 16 connected to the conduit 846b.

The flow completion apparatus 710 may also include one or more male radial penetrator couplings 854, each of which is connected to a corresponding service and control line 844c within the tubing hanger 718. The male couplings 854 are mounted on the outer diameter of the tubing hanger in a conventional fashion, and each male coupling is releasably connectable with a corresponding female coupling (not shown) that is carried by a conventional radial penetrator assembly which is mounted on the tubing spool 712. Thus, when the tubing hanger is landed on the tubing spool, the penetrator assembly is actuated to bring the female couplings into engagement with their corresponding male couplings 854 to thereby establish communication between the service and control conduits 844c in the tubing hanger 718 and the external conduits to which the female couplings are connected. It should be noted that, one or more of the service and control conduits 844c may be connected within the tubing hanger to a corresponding service and control conduit which enters from the top of the tubing hanger. In this manner, a device with which the THRT 722 communicates during installation of the tubing hanger, for example an SCSSV, can be connected to an external service and control line through the tubing spool 712 once the THRT is disconnected from the tubing hanger.

In order to ensure that the tubing hanger 718 is properly angularly oriented in the tubing spool 712, and that the male couplings 854 are therefore properly aligned with the female couplings, the flow completion apparatus 710 preferably includes a fine alignment key 856, which ideally is bolted onto the outer diameter of the tubing hanger. As the tubing hanger is landed in the tubing spool, the fine alignment key will engage a corresponding tapered slot in the central bore 716 and thereby force the tubing hanger to achieve the orientation defined by the tapered slot.

Figure 18:
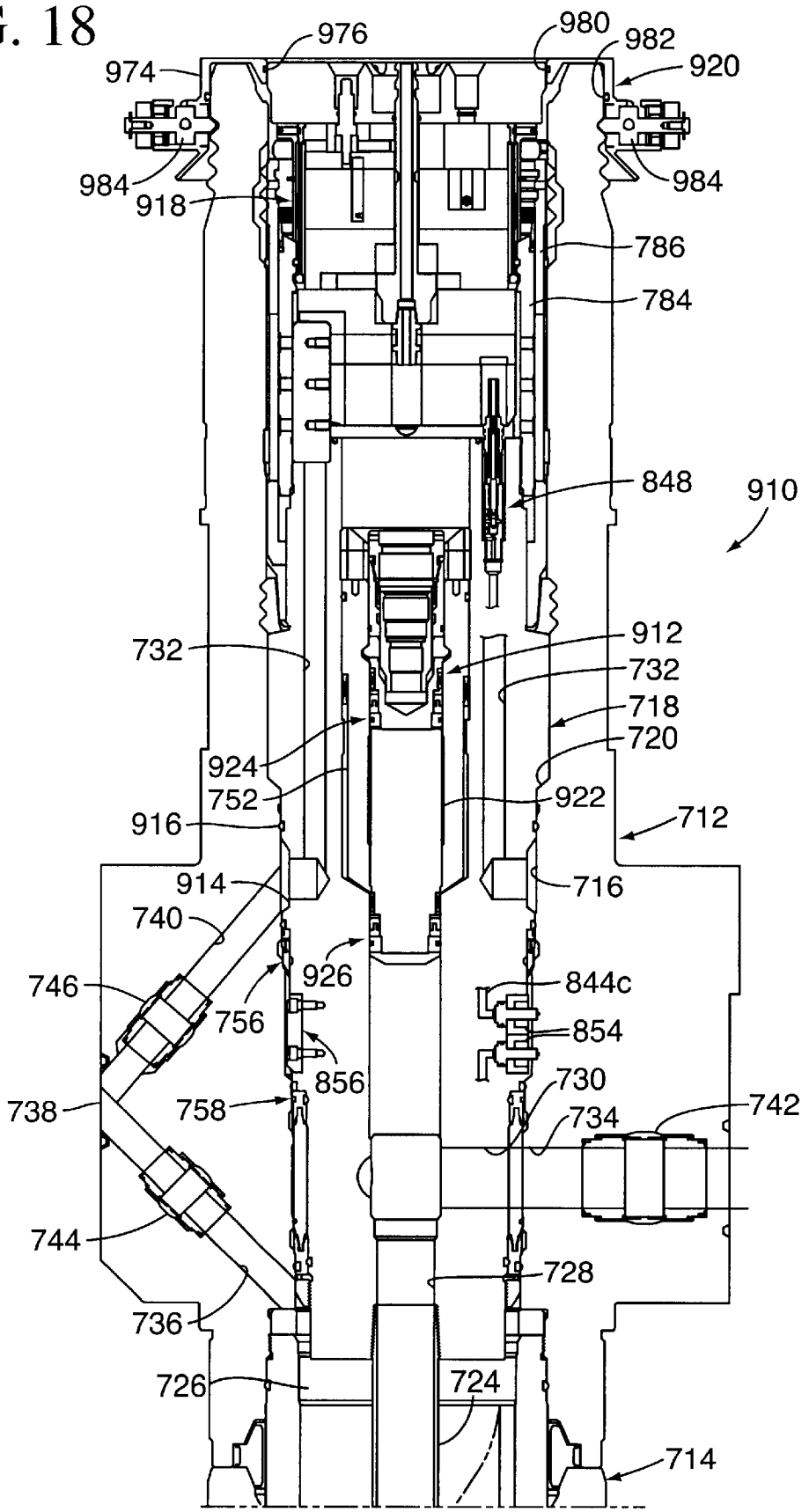
FIG. 18 is a longitudinal cross-sectional view of still another embodiment of the flow completion apparatus of the present invention shown in the production mode.

Yet another embodiment of the present invention is shown in FIG. 18. The flow completion apparatus of this embodiment, which is indicated generally by reference number 910, is shown to be similar in many respects to the flow completion apparatus 710 discussed immediately above. However, in this embodiment of the flow completion apparatus 910, the tubing hanger 718 comprises a single "dual-sealing" wireline plug 912 to seal the production bore 728 above the production passageway 730. In addition, the tubing hanger 718 includes a radially oriented annulus gallery 914 which is formed on the outer diameter of the tubing hanger between the secondary seal 756 and an annular tertiary seal 916, such as a non-metallic face-type seal, that is positioned between the tubing hanger and the central bore 716. Furthermore, the tubing hanger annulus bore 732 comprises a number of branches which extend from the annulus gallery 914 to the top of the tubing hanger. Finally, the flow completion apparatus 910 preferably comprises a light-weight, non pressure-containing tree cap 918 which is installed in the tubing spool 712 above the tubing hanger 718, and an optional debris cap 920 which is installed on the tubing spool 712 above the tree cap 918.

The dual-sealing plug 912 comprises a wireline deployable plug body 922 which is removably connectable within the bore insert 752 that is secured and sealed in the production bore 728. In addition, the dual-sealing plug 912 includes a first annular sealing assembly 924 for sealing between the body 922 and the bore insert 752, and a second annular sealing assembly 926 for sealing between the body and, preferably, the production bore 728. Moreover, the first and second sealing assemblies 924, 926 each ideally include at least one metal straight-bore type ring seal. In this manner, the single plug 912 performs the function of the two individual plugs 748, 750. However, only one running trip is required to install or remove the plug 912, as opposed to separate trips to install or remove each of the plugs 748, 750.

Referring to FIGS. 19 and 19A–19C, the tree cap 918 is shown to comprise an annular body 928 which includes a number of radial sections that are secured together by a plurality of longitudinal bolts 930. The body 928 is preferably manufactured from ultra-high molecular weight polyethylene, which has a very low water adsorption rate on the order of about 0.03% in the 24 hour ASTM D570 test. This material not only makes the tree cap 918 lightweight, thereby allowing the tree cap to be installed by an ROV, but also isolates the tree cap from the cathodic protection system of the flow completion apparatus. Moreover, any longitudinal forces acting on the tree cap will be borne by the bolts 930, thereby relieving the body 928 of this function.

Figure 19:
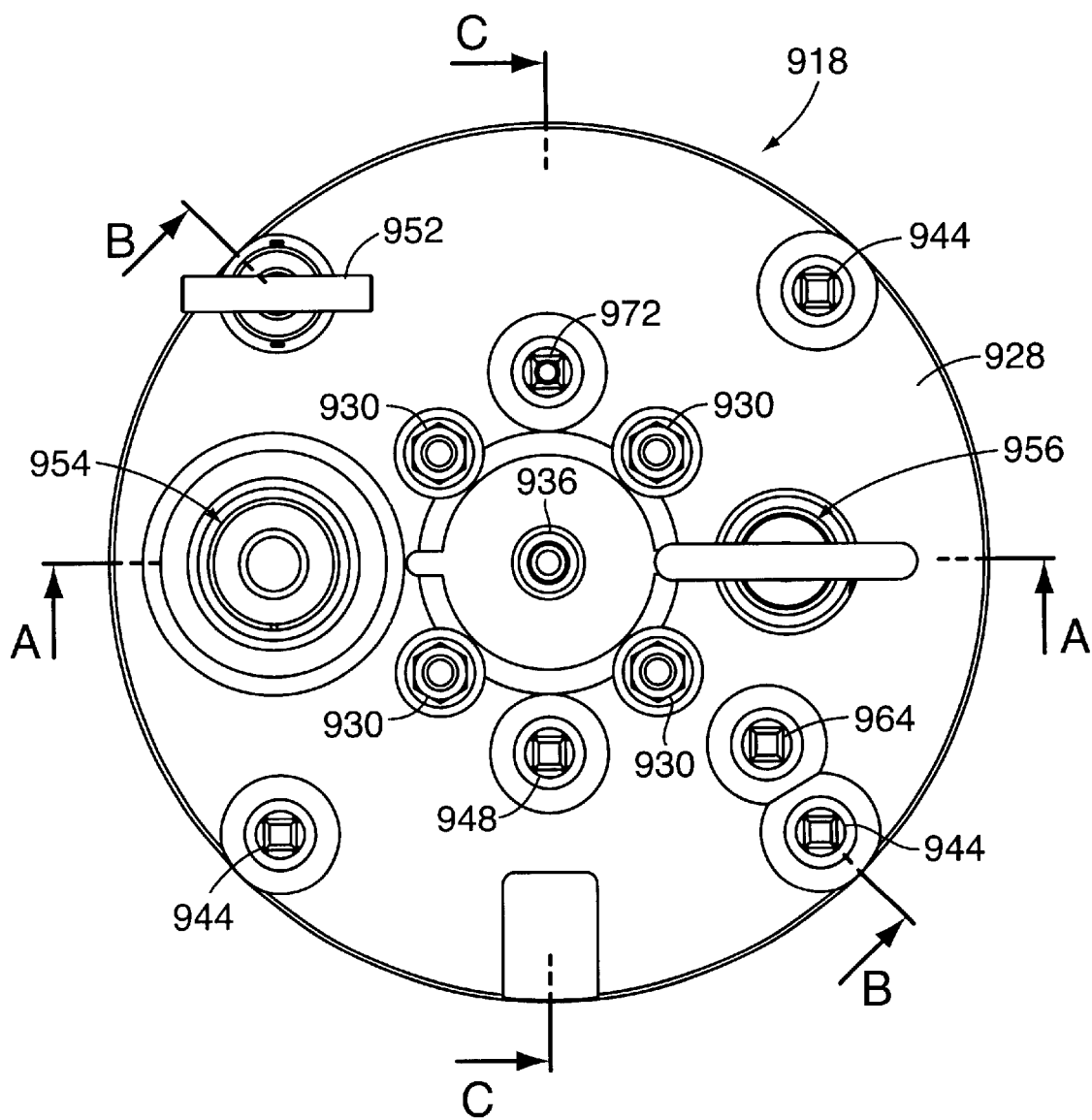
FIG. 19 is a top view of the tree cap component of the flow completion apparatus shown in FIG. 18.
Figure 19A:
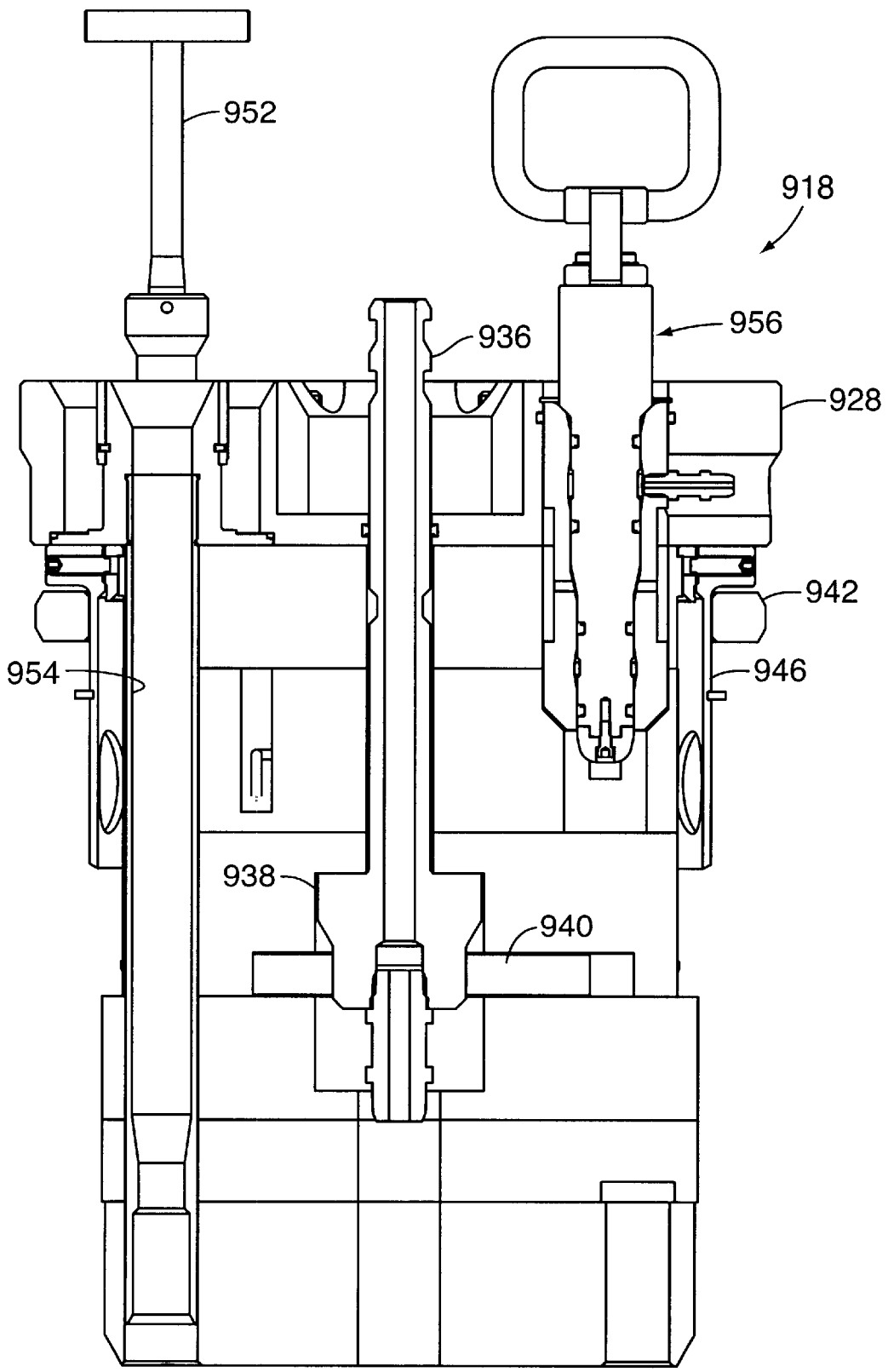
FIG. 19A is a cross-sectional view of the tree cap taken along line A—A of FIG. 19.
Figure 19B:
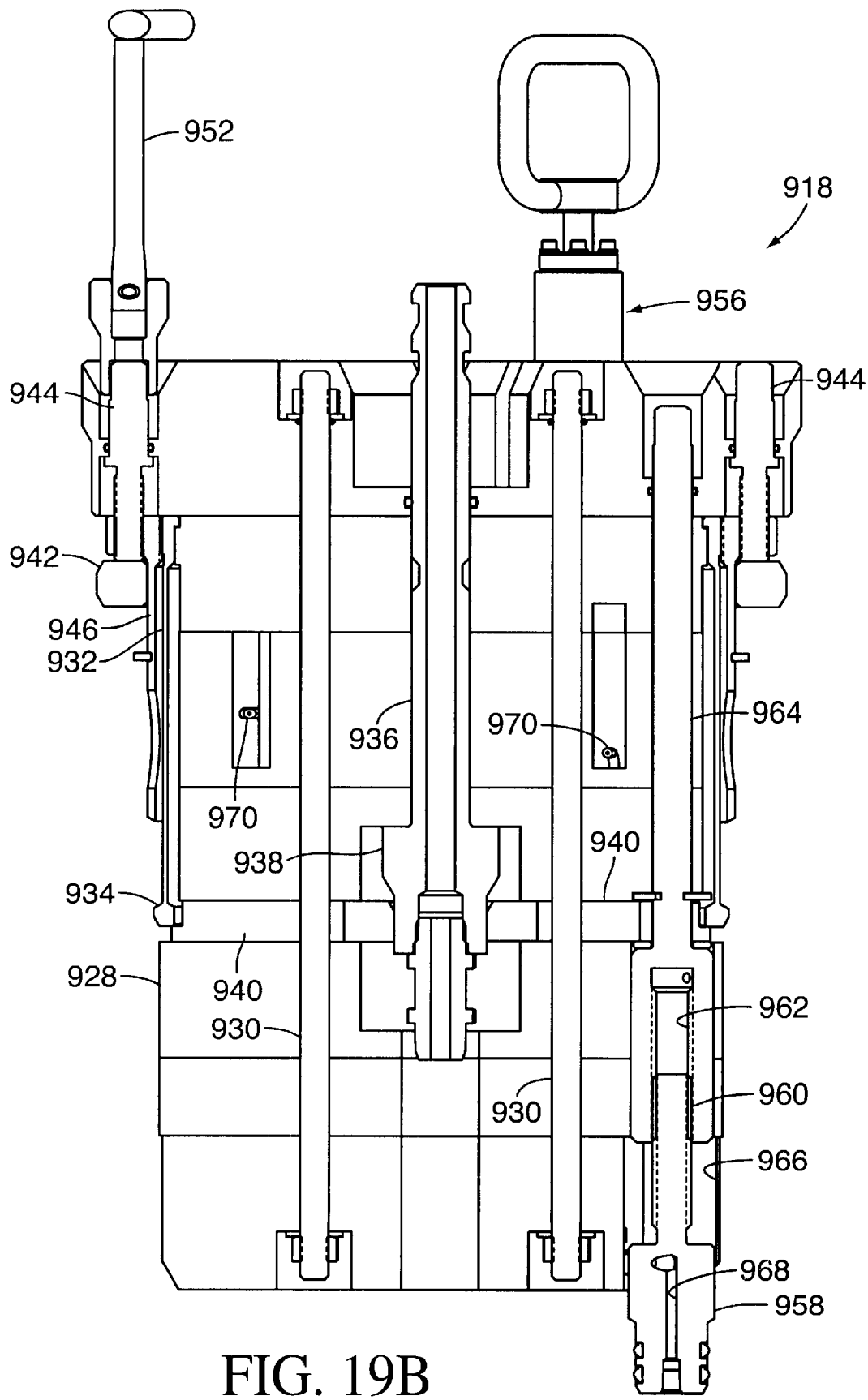
FIG. 19B is a cross-sectional view of the tree cap taken along line B—B of FIG. 19.
Figure 19C:
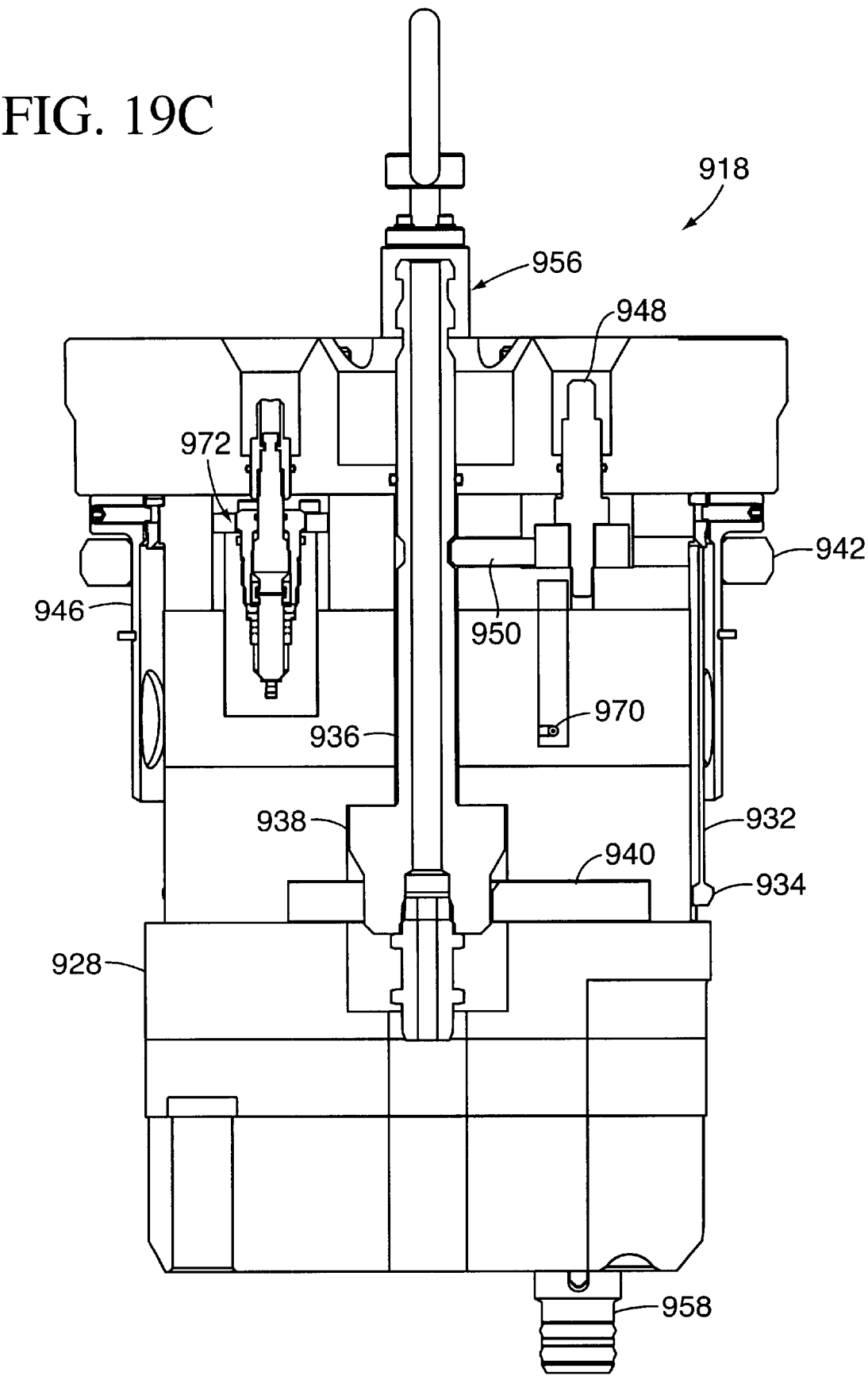
FIG. 19C is a cross-sectional view of the tree cap taken along line C—C of FIG. 19.

Referring specifically to FIG. 19B, the tree cap 918 also comprises a collet sleeve 932 which is threaded onto the outer diameter of the body 928 near the top of the tree cap. The collet sleeve 932 includes a number of downwardly depending collet fingers 934 which are adapted to engage a corresponding groove that is formed in the upper rim 784 of the tubing hanger 718 when the tree cap 918 is landed in the tubing spool 712. The tree cap further includes an elongated lock mandrel 936 which comprises a camming ring 938 that is attached to a lower end thereof, a plurality of locking dogs 940 which are slidably received in corresponding radial apertures that are formed in the body 928, and a landing ring 942 which is secured by a number of lock down screws 944 in a support sleeve 946 that is threaded onto the collet sleeve 932. Also, as shown in FIG. 19C, the tree cap 918 preferably includes a key 948 that comprises a radially extending tongue 950 which is received in a corresponding recess that is formed on the lock mandrel 936. The key 950 serves to maintain the lock mandrel 936 in the up position until the tree cap 918 is landed in the tubing spool 712.

When the tree cap 918 is landed in the tubing spool 712, the landing ring 942 will land on the top of the tubing hanger locking mandrel 786 and the collet fingers 934 will enter their corresponding groove on the upper rim 784 (see FIG. 18). After the ROV turns the key 948 to release the lock mandrel 936, the lock mandrel is pushed downward by an ROV handling tool (not shown) to force the camming ring 938 against the locking dogs 940, which in turn will move radially outwardly against the collet fingers 934 to secure the collet fingers in their groove. The longitudinal spacing between the landing ring 942 and the collet fingers 934 can be adjusted using the lockdown screws 944. Also, once the tree cap 918 is secured to the tubing hanger 718, the lock down screws 944 can be tightened by an ROV torque tool 952 to firmly secure the landing ring 942 against the tubing hanger locking mandrel 786. In this manner, the landing ring 942 will function to maintain the tubing hanger locking mandrel 786 in the locked position.

As shown in FIG. 19A, the tree cap 918 can include a conduit 954 which comprises a locking profile for an electrical connector. Thus, the tree cap can facilitate connecting an external electrical service and control line to a corresponding service and control conduit in the tubing hanger 718. The tree cap 918 may also include an ROV hot stab 956 through which a corrosion inhibitor may be injected into the central bore 716 surrounding the tree cap.

As shown in FIGS. 19B and 19C, the tree cap 918 may also comprise an annulus seal stab 958. The seal stab 958 ideally comprises a threaded stem 960 which is received in a corresponding threaded receptacle 962 that is attached to the lower end of an actuating shaft 964. In addition, the seal stab 958 is optimally keyed to a surrounding receptacle 966 in a manner which prevents rotation but permits longitudinal movement of the seal stab relative to the receptacle. Thus, rotation of the actuating shaft by a suitable ROV tool (not shown) will move the seal stab 958 downward into engagement with, for example, the annulus bore 732 in the tubing hanger 718. The seal stab 958 may be a blind stab, in which event it functions to provide a backup barrier to the annulus bore 732. Alternatively, the seal stab 958 may comprise a through bore 968 which communicates through a corresponding conduit 970 with a fluid coupling 972 that is mounted in the top of the tree cap 918. In this manner, the pressure in the tubing annulus 726 may be monitored through the seal stab 958 and a corresponding external service and control line which is attached to the coupling 972, or the seal stab can be used to convey gas or other fluids from the external service and control line into the tubing annulus.

Figure 20:
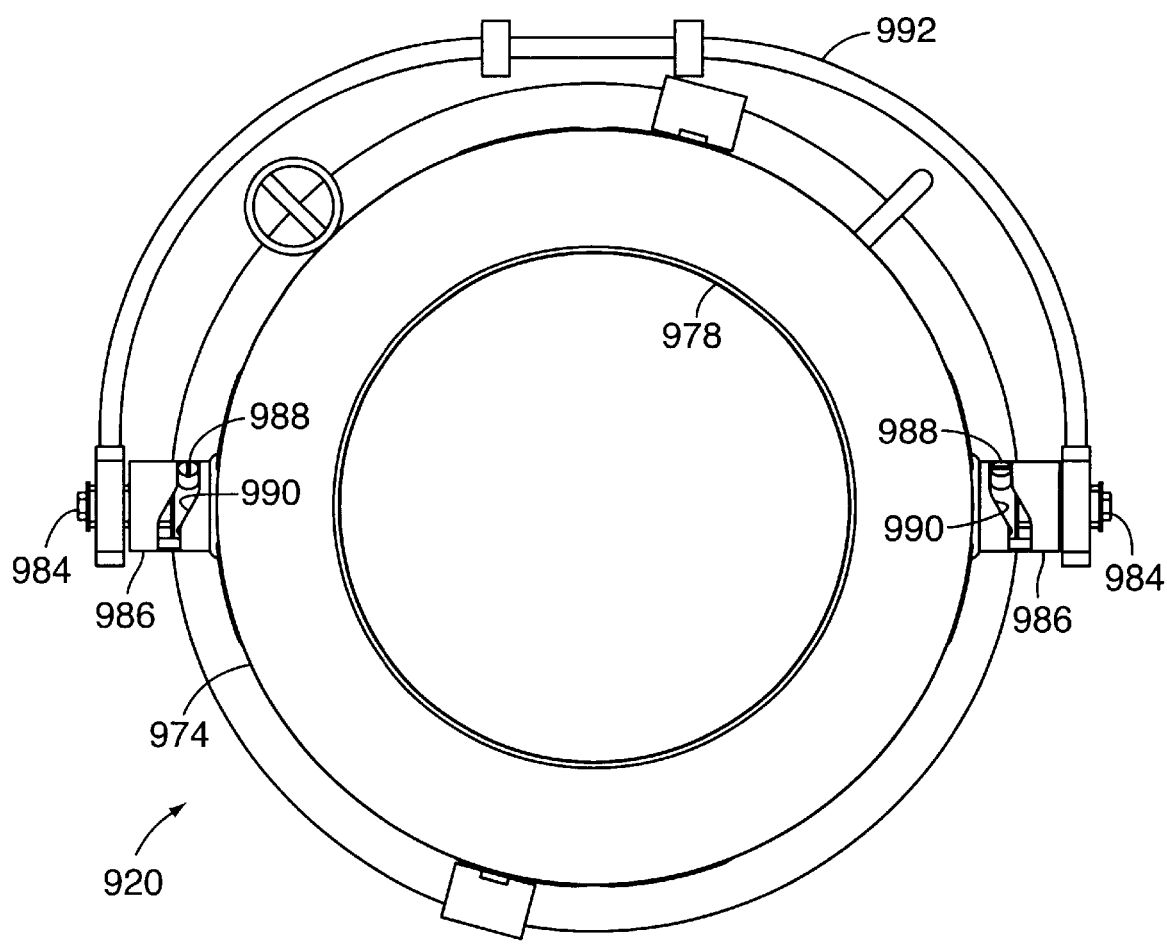
FIG. 20 is a top view of the locking cap component of the flow completion apparatus shown in FIG. 18.

Referring to FIGS. 18 and 20, the debris cap 920 is preferably a separate member which is mounted to the top of the tubing spool 712 after the tree cap 918 is installed. The debris cap 920 comprises an annular body which includes an outer rim 974 that is sized to fit around the outer diameter of the tubing spool 712 and an inner rim 976 that is adapted to fit closely around the upper end of the tree cap body 928. The inner rim 976 defines an enlarged opening 978 in the debris cap 920 through which the top of the tree cap 918 may be accessed. In addition, the debris cap 920 preferably includes a first annular seal 980 which is positioned between the inner rim 976 and the tree cap 918 and a second annular seal 982 which is positioned between the outer rim 974 and the tubing spool 712. The seals 980, 982 function to keep sea water out of and corrosion inhibitor in the central bore 716 around the tree cap 918.

The debris cap 920 is secured to the tubing spool 712 by preferably two locking pins 984, each of which is rotatably received in a cylindrical housing 986 that is attached to the outer rim 974. Each pin 984 includes a radially extending lug 988 which slidably engages a corresponding dogleg groove 990 that is formed in the housing 986. In addition, the debris cap 920 includes a handle 992 which is connected to both pins 984. When the handle 992 is in the raised position, the lugs 988 will occupy the radial outer portion of the dogleg groove 990 and the pins will be in a radially outward position. When the handle 992 is lowered, the lugs 988 will follow the dogleg groove 990 radially inwardly and thereby force the pins into engagement with an annular groove which is formed on the outer diameter of the tubing spool 712 to thereby lock the debris cap to the tubing spool.

In a variation of the flow completion apparatus of the present invention, the seal which is associated with the annulus stab in the THRT and the seal which is positioned between the tubing hanger and the tubing spool above the workover passageway, such as the seal 916 shown in FIG. 18, need not be pressure containing seals. Rather, they can simply be elastomer or metal seals that are provided to prevent the passage of debris and to direct the annulus fluid along the preferred flow path through the tubing hanger annulus bore and the THRT annulus port. Thus, while the central bore of the tubing spool will be exposed to pressure equal to the pressure in the tubing annulus, the debris in the annulus fluid will be blocked by the above-mentioned seals and will therefore not be allowed to foul the tubing hanger lockdown mechanism or erode the central bore.

In yet another variation of the present invention, the seal which is associated with the annulus stab in the THRT and the seal which is positioned between the tubing hanger and the tubing spool above the workover passageway, such as the seal 916 shown in FIG. 18, may be eliminated entirely. Instead, the landing seat of the tubing hanger, that is, the seat which engages the landing shoulder in the central bore from which the tubing hanger is suspended, is located above the workover passageway. The contact between the landing seat and the landing shoulder is sufficiently strong to prevent the flow of debris past the landing seat. In addition, the annulus stab is a non-sealing metal stab which has a radial clearance with the annulus bore that is between about 0.005 inch and 0.010 inch. This clearance is sufficiently small to prevent the significant passage of debris.

It should be recognized that, while the present invention has been described in relation to the preferred embodiments thereof, those skilled in the art may develop a wide variation of structural and operational details without departing from the principles of the invention. For example, the various elements shown in the different embodiments may be combined in a manner not illustrated above. Therefore, the appended claims are to be construed to cover all equivalents falling within the true scope and spirit of the invention.

What is claimed is:

1. A flow completion apparatus for controlling the flow of fluid through a tubing string which extends into a well bore and defines a tubing annulus surrounding the tubing string, the flow completion apparatus comprising:

a wellhead housing which is installed at an upper end of the well bore;

a tubing spool which is connected over the wellhead housing and which includes a central bore that extends axially therethrough, a production outlet which communicates with the central bore, and an annulus passageway which communicates with the tubing annulus;

a tubing hanger which is supported in the central bore, is connected to an upper end of the tubing string, and includes a production bore which extends axially therethrough and a production passageway which communicates between the production bore and the production outlet;

a first closure member which is positioned in the production bore above the production passageway; and a first annular seal which is positioned between the tubing hanger and the central bore above the production passageway;

wherein the tubing spool further comprises a workover passageway which extends between the annulus passageway and a portion of the central bore that is located above the first seal, and the tubing hanger further comprises an annulus bore which extends between the workover passageway and the top of the tubing hanger;

whereby fluid communication between the tubing annulus and the top of the tubing hanger may be established through the annulus passageway, the workover passageway and the annulus bore.

2. The flow completion apparatus of claim 1, further comprising:

a BOP which is removably connectable to the top of the tubing spool and which includes a BOP bore, a first set of BOP rams, and at least one choke and kill line that communicates with a portion of the BOP bore which is located below the first BOP rams; and a THRT which is removably connectable to the top of the tubing hanger and which includes a cylindrical outer surface portion, a production port that communicates with the production bore, and an annulus port that comprises a first end which communicates with the annulus bore and a second end which communicates with the outer surface portion;

wherein the first BOP rams are adapted to sealingly engage the outer surface portion above the second end of the annulus port;

whereby fluid communication between the tubing annulus and the BOP choke and kill line may be established through the annulus passageway, the workover passageway, the annulus bore, the annulus port and the portion of the BOP bore which is located below the first BOP rams.

3. The flow completion apparatus of claim 2:

wherein the BOP comprises a second set of BOP rams;

wherein the choke and kill line communicates with a portion of the BOP bore which is located between the first and second BOP rams; and wherein the second BOP rams are adapted to sealingly engage the outer surface portion below the second end of the annulus port;

whereby fluid communication between the tubing annulus and the BOP choke and kill line may be established through the annulus passageway, the workover passageway, the annulus bore, the annulus port and the portion of the BOP bore which is located between the first and second BOP rams.

4. The flow completion apparatus of claim 2, wherein the THRT further comprises:

a cylindrical body which has an inner diameter surface and which is sealed to the tubing hanger radially outwardly of the annulus bore;

a tubular member which has an outer diameter surface and which is received within the body and sealed to the tubing hanger radially inwardly of the annulus bore; and means for securing the tubular member to the body;

wherein the radius of the outer diameter surface is less than the radius of the inner diameter surface; and wherein the annulus port is defined between the outer diameter surface and the inner diameter surface.

5. The flow completion apparatus of claim 1, further comprising:

first and second production closure members for controlling flow through the production outlet;

a first annulus closure member for controlling flow through the annulus passageway;

an annulus outlet in the tubing spool which communicates with both the annulus passageway and the workover passageway;

a second annulus closure member for controlling flow through the annulus outlet;

a workover closure member for controlling flow through the workover passageway;

a crossover line extending from between the first and second production closure members to the annulus outlet; and a crossover closure member for controlling flow through the crossover line;

wherein with the first annulus closure member and the second production closure member closed and the remaining closure members open, a first flow path may be established through the annulus bore, the workover passageway, the annulus outlet, the crossover line, the production outlet and the production bore.

6. The flow completion apparatus of claim 5, further comprising:

a BOP which is removably connectable to the top of the tubing spool and which includes a BOP bore, a first set of BOP rams, and at least one choke and kill line that communicates with a portion of the BOP bore which is located below the first BOP rams; and a THRT which is removably connectable to the top of the tubing hanger and which includes a cylindrical outer surface portion, a production port that communicates with the production bore, and an annulus port that comprises a first end which communicates with the annulus bore and a second end which communicates with the outer surface portion;

wherein the first BOP rams are adapted to sealingly engage the outer surface portion above the second end of the annulus port;

wherein with the tubing hanger closed below the tubing hanger, a first circulation path may be established through the choke and kill line, the portion of the BOP bore which is located below the first rams, the annulus port, the first flow path and the production port.

7. The flow completion apparatus of claim 1, further comprising:

a crossover conduit in the tubing hanger which extends between the annulus bore and a portion of the production bore that is located above the first closure member;

wherein fluid communication between the annulus bore and the production bore may be established through the crossover conduit.

8. The flow completion apparatus of claim 1, further comprising:

a second closure member which is positioned in the production bore above the first closure member; and a second annular seal which is positioned between the tubing hanger and the central bore above the first seal;

wherein a first pressure-containing barrier between the well bore and the environment is provided by the first closure member and the first seal; and wherein a second pressure-containing barrier between the well bore and the environment is provided by the second closure member and the second seal;

whereby both the first and second barriers are supported on the tubing hanger.

9. The flow completion apparatus of claim 8, wherein the first and second closure members each comprise a wireline deployable plug.

10. The flow completion apparatus of claim 8, wherein the first closure member comprises a first ring seal which is mounted on a wireline deployable plug body and the second closure member comprises a second ring seal which is mounted on the plug body above the first ring seal.

11. The flow completion apparatus of claim 1, further comprising a tree cap which comprises:

an annular non-metallic body; and means for securing the body to the tubing hanger or the tubing spool.

12. The flow completion apparatus of claim 11, wherein the body comprises a plurality of radial sections and the tree cap comprises a number of elongated bolts which extend through the body and connect the radial sections.

13. The flow completion apparatus of claim 11, wherein the tree cap further comprises:

an annulus seal stab for engaging the annulus bore.

14. The flow completion apparatus of claim 13, wherein the tree cap further comprises:

a fluid coupling which is mounted on the body and which is adapted to be connected to an external service and control line; and a conduit which communicates between the fluid coupling and a bore in the annulus seal stab;

wherein fluid communication may be established between the annulus bore and the external service and control line through the annulus seal stab.

15. The flow completion apparatus of claim 11, wherein the tree cap is sufficiently lightweight to be installed using an ROV.

16. The flow completion apparatus of claim 11, wherein the securing means comprises:

a plurality of collet fingers which are secured to the body;

a lock mandrel which includes a camming surface; and a number of locking dogs which are disposed generally radially in the body and which each comprise a first end which is adapted to be engaged by the camming surface and a second end which is adapted to contact one or more of the collet fingers;

wherein actuation of the lock mandrel will force the locking dogs radially outwardly against the collet fingers to lock the collet fingers in a corresponding groove that is formed on the tubing hanger or the tubing spool.

17. The flow completion apparatus of claim 16, wherein the lock mandrel is adapted to be engaged by an ROV, whereby the ROV can be used to lock the tree cap to the tubing hanger or the tubing spool.

18. The flow completion apparatus of claim 11, wherein the tree cap further comprises:

a landing ring which is movably secured to the body; and means for adjusting landing ring axially relative to the body;

wherein when the tree cap is secured to the tubing hanger or the tubing spool, the landing ring engages a tubing hanger locking mandrel which is slidably mounted on the tubing hanger;

whereby the landing ring maintains the position of the tubing hanger locking mandrel fixed relative to the tubing hanger.

19. The flow completion apparatus of claim 18, wherein the adjusting means is adapted to be actuated by an ROV.

* * * * *